(12) United States Patent
Sato et al.

(10) Patent No.: US 7,204,710 B1
(45) Date of Patent: Apr. 17, 2007

(54) SFP MODULE MOUNTING STRUCTURE

(75) Inventors: Seiichiro Sato, Kawasaki (JP); Kenji Tsutsumi, Kawasaki (JP); Hiroshi Takawa, Kawasaki (JP); Kenji Toshimitsu, Kawasaki (JP); Takashi Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/376,104

(22) Filed: Mar. 16, 2006

(30) Foreign Application Priority Data

Nov. 28, 2005 (JP) .............................. 2005-341908

(51) Int. Cl.
*H01R 13/62* (2006.01)
(52) U.S. Cl. ..................................... 439/326
(58) Field of Classification Search ................ 439/326, 439/376, 341, 607
See application file for complete search history.

(56) References Cited

U.S. PATENT DOCUMENTS

| 6,558,191 B2* | 5/2003 | Bright et al. ............ 439/541.5 |
| 6,655,995 B1* | 12/2003 | Reisinger et al. ........... 439/607 |
| 6,755,689 B2* | 6/2004 | Zhang et al. ............... 439/607 |
| 6,830,470 B1* | 12/2004 | Lynch et al. ................ 439/326 |
| 7,044,763 B1* | 5/2006 | Inoue et al. ................ 439/326 |
| 2002/0094721 A1* | 7/2002 | Schulz et al. ............... 439/607 |
| 2002/0094722 A1* | 7/2002 | Festag ........................ 439/607 |

* cited by examiner

*Primary Examiner*—Tulsidas C. Patel
*Assistant Examiner*—Vladimir Imas
(74) *Attorney, Agent, or Firm*—Staas & Halsey LLP

(57) ABSTRACT

An SFP module mounting structure whereby the region of a printed wiring board for mounting SFP modules is enlarged and thus the SFP modules can be mounted with high density. A swing mechanism constituted by the coupling between a holder and a base allows the holder to be swung in directions toward and away from the printed wiring board. Thus, when mounting an SFP module, the SFP module can be inserted into the holder with the holder kept in an obliquely raised state relative to the printed wiring board. Also, when detaching the SFP module, the SFP module can be pulled out of the holder with the holder obliquely raised from the printed wiring board.

36 Claims, 23 Drawing Sheets

FIG. 4A
FIG. 4B
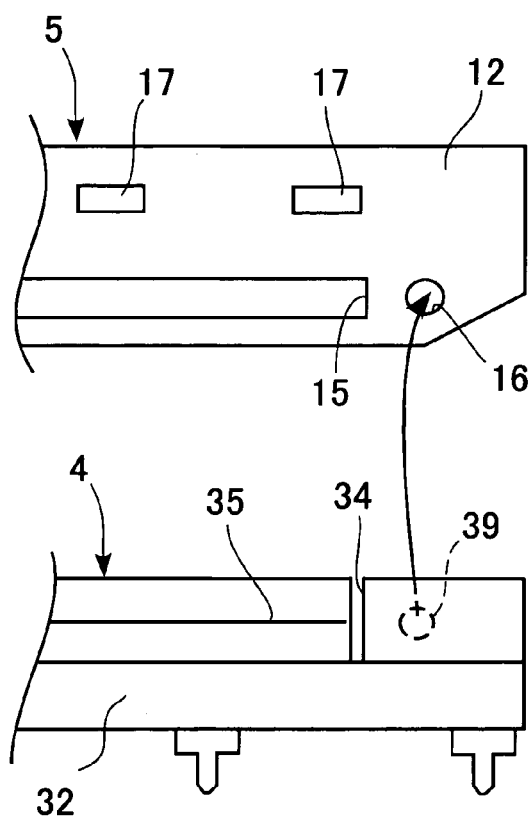
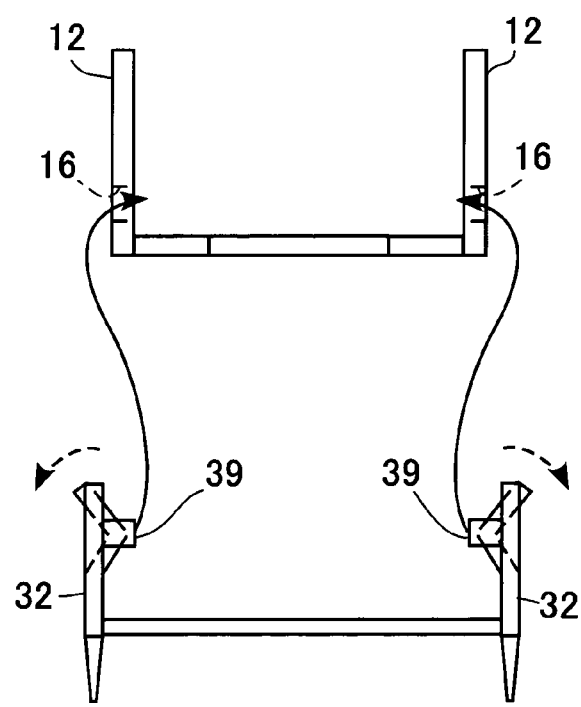

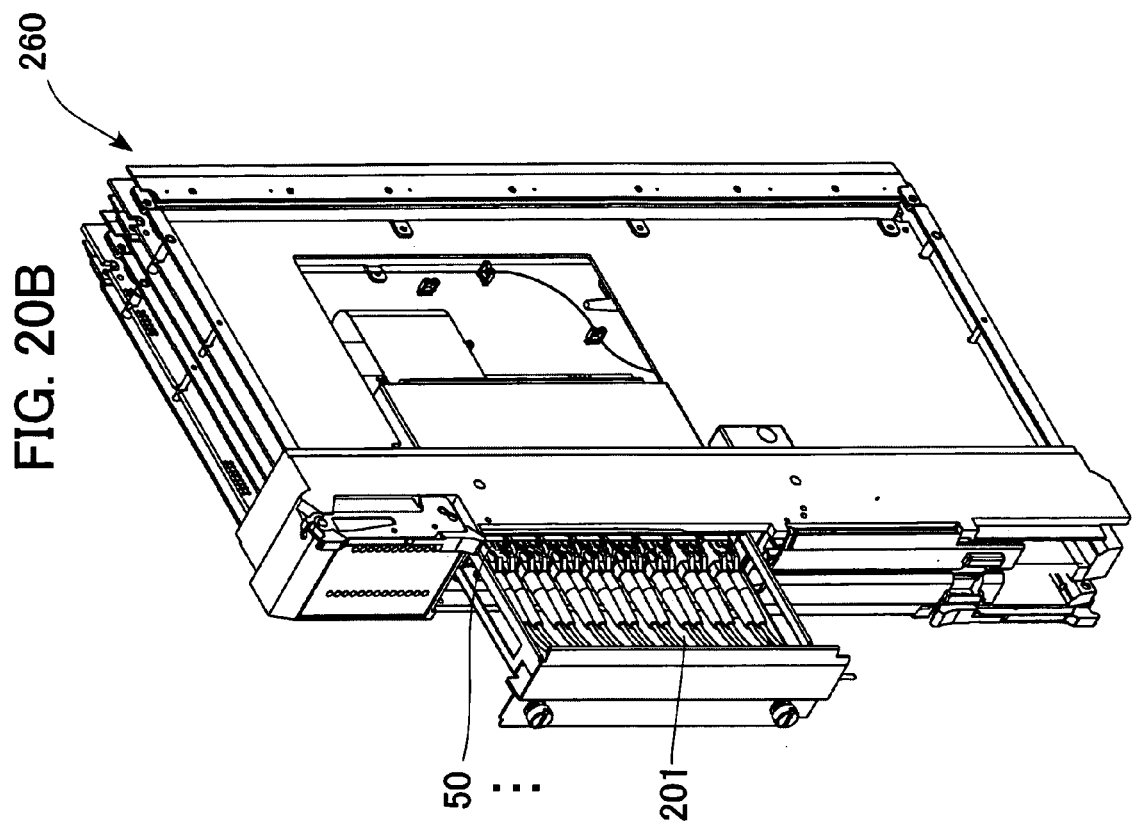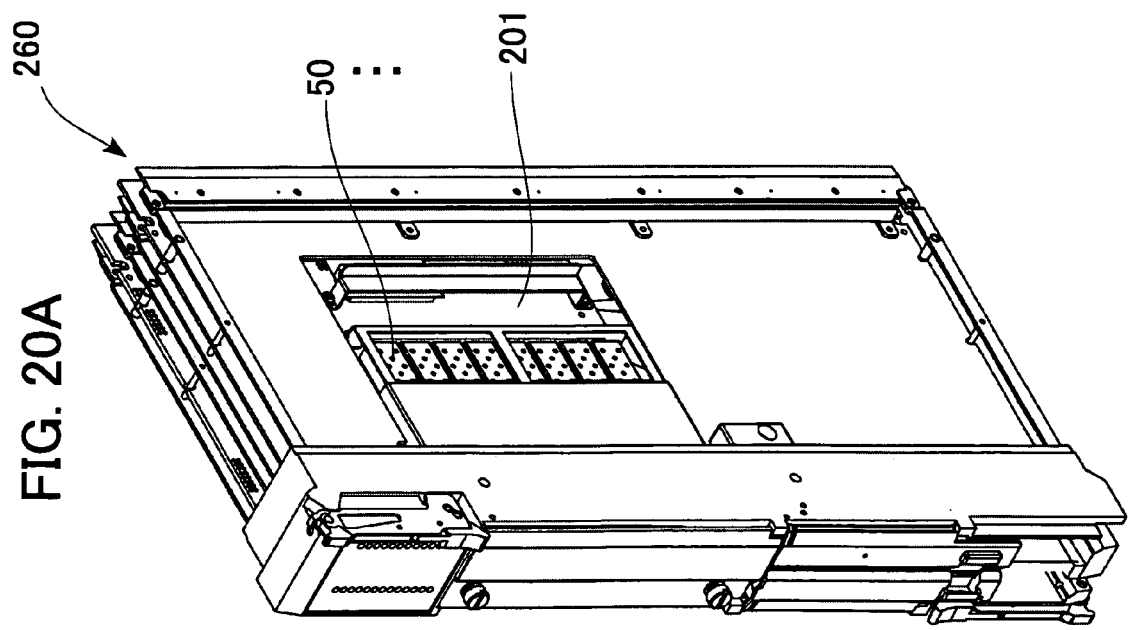

SFP MODULE MOUNTING STRUCTURE

CROSS-REFERENCE TO RELATED APPLICATIONS

This application is based upon and claims the benefits of priority from the prior Japanese Patent Application No. 2005-341908, filed on Nov. 28, 2005, the entire contents of which are incorporated herein by reference.

BACKGROUND OF THE INVENTION

1. Field of the Invention

The present invention relates to small form factor pluggable module ("SFP module") mounting structures, and more particularly, to a mounting structure for an SFP module which is connected to a connector mounted on a printed wiring board.

2. Description of the Related Art

An SFP module such as an optical transceiver used in high-speed optical communications is inserted into and thus connected to a connector mounted on a printed wiring board for communication circuitry. The printed wiring board is provided with a holder for fixing the SFP module accurately and stably near a region where the connector is mounted. The holder serves to guide the SFP module toward the connector and also to stably fix the SFP module connected to the connector (cf. U.S. Pat. No. 6,655,995 B1).

FIGS. 22A, 22B and 22C illustrate conventional mounting structure and method for mounting an SFP module, wherein FIG. 22A shows a state of a printed wiring board before a holder and an SFP module are mounted thereon, FIG. 22B shows how the holder and the SFP module are mounted on the printed wiring board, and FIG. 22C shows how the SFP module is detached from the holder (i.e., from the connector on the printed wiring board).

As shown in FIG. 22A, before the SFP module is mounted, a solder pad 102 for the surface mounting of the connector and a plurality of through holes 103 for passing respective legs of the holder therethrough are formed in a mounting region of the printed wiring board 101 where the SFP module is to be mounted.

Also, as shown in FIG. 22B, the SFP module 104 has an engaging portion 107 protruding from a lower surface of a front end portion thereof. The engaging portion 107 is adapted to fit in a fitting hole 106 formed near an open end of the holder 105 so that the SFP module 104 may be locked after being inserted into the holder 105. To permit the engagement, an escape hole 108 of a relatively large size is formed in the corresponding position of the printed wiring board 101 to allow the engaging portion 107 to project thereinto.

First, the connector 109 is mounted in position by soldering on the surface of the printed wiring board 101. Then, a lower holder 111, which constitutes a lower part of the holder 105, is attached to the printed wiring board 101 such that the connector 109 is situated inside the lower holder 111. In this case, the legs 112 of the lower holder 111 are press-fitted into the respective through holes 103 of the printed wiring board 101, or after the legs are inserted, the legs are soldered to the printed wiring board 101, thereby fixing the lower holder 111 to the printed wiring board 101. Subsequently, the SFP module 104 is placed inside the lower holder 111 so that a rear end portion thereof may be connected to the connector 109. At this time, the SFP module 104 and the lower holder 111 are locked together by fitting the engaging portion 107 into the fitting hole 106.

Then, an upper holder 113, which constitutes an upper part of the holder 105, is combined with the lower holder 111, whereupon the mounting of the SFP module 104 is completed.

To detach the SFP module 104 mounted in this manner, first, the engaging portion 107 which is exposed to the underside of the printed wiring board 101 through the escape hole 108 is unlocked or disengaged from the fitting hole 106.

Then, as indicated by the broken lines in FIG. 22C, the SFP module 104 is pulled frontward from the opening of the holder 105 and is detached from the holder 105.

In the conventional SFP module mounting structure, however, the printed wiring board 101 needs to be additionally provided with the escape hole 108 for receiving the engaging portion 107 as mentioned above, which makes the machining complicated. Also, no wiring can be formed in a region corresponding to the escape hole 108 of the printed wiring board 101, giving rise to the problem that the degree of freedom of wiring is limited.

The engaging portion 107 is located near the lower surface of the SFP module 104, and accordingly, the disengagement of the SFP module 104 from the holder 105 needs to be carried out from the bottom side of the escape hole 108, that is, from the underside of the printed wiring board 101 opposite the component mounting side, making the detachment of the SFP module 104 troublesome.

Further, to permit the SFP module 104 to be detached from/attached to the holder 105 for replacement, a space needs to be provided so that the SFP module 104 can be moved frontward/rearward over a given stroke. Because of the stroke thus required, no components can be mounted in a region indicated by hatching in the figures plus the region corresponding to the escape hole 108, which is disadvantageous from the point of view of high-density mounting. Also, these unused regions place restrictions on the positioning of the SFP module 104 on the printed wiring board 101.

FIGS. 23A and 23B are partly cutaway views of a network interface card on which the SFP module is mounted, wherein FIG. 23A shows the holder and the SFP module mounted at a certain position on the printed wiring board of the network interface card, and FIG. 23B illustrates the problem that arises when the SFP module is detached.

If the holder 105 is situated at an arbitrary position on the printed wiring board 101 of the network interface card 115 as shown in FIG. 23A, it is possible that the minimum required bend radius fails to be allowed for optical fiber cables 116 when the fiber cables 116 are detached from/attached to the SFP module 104.

Specifically, when the optical fiber cables 116 are moved frontward/rearward over a given stroke at the time of detachment/attachment as shown in FIG. 23B, an excessive bending load acts upon the optical fiber cables 116, possibly fracturing the fiber cables 116 or adversely affecting the transmission characteristics of light.

SUMMARY OF THE INVENTION

The present invention was created in view of the above circumstances, and an object thereof is to provide an SFP module mounting structure whereby the region of a printed wiring board for mounting SFP modules is enlarged and thus the SFP modules can be mounted with high density.

To achieve the object, there is provided a mounting structure for an SFP module which is connected to a connector mounted on a printed wiring board. The SFP module mounting structure includes a holder adapted to guide the SFP module toward the connector and capable of immovably holding the SFP module, and a swing mechanism supporting the holder in a manner such that the holder is swingable in directions toward and away from the printed wiring board about a pivotal element provided at one end of the holder close to the connector.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 4A and 4B illustrate the manner of how a lower holder and the base are combined.

FIGS. 20A and 20B show a modification of the embodiment.

DESCRIPTION OF THE PREFERRED EMBODIMENTS

Figure 1:
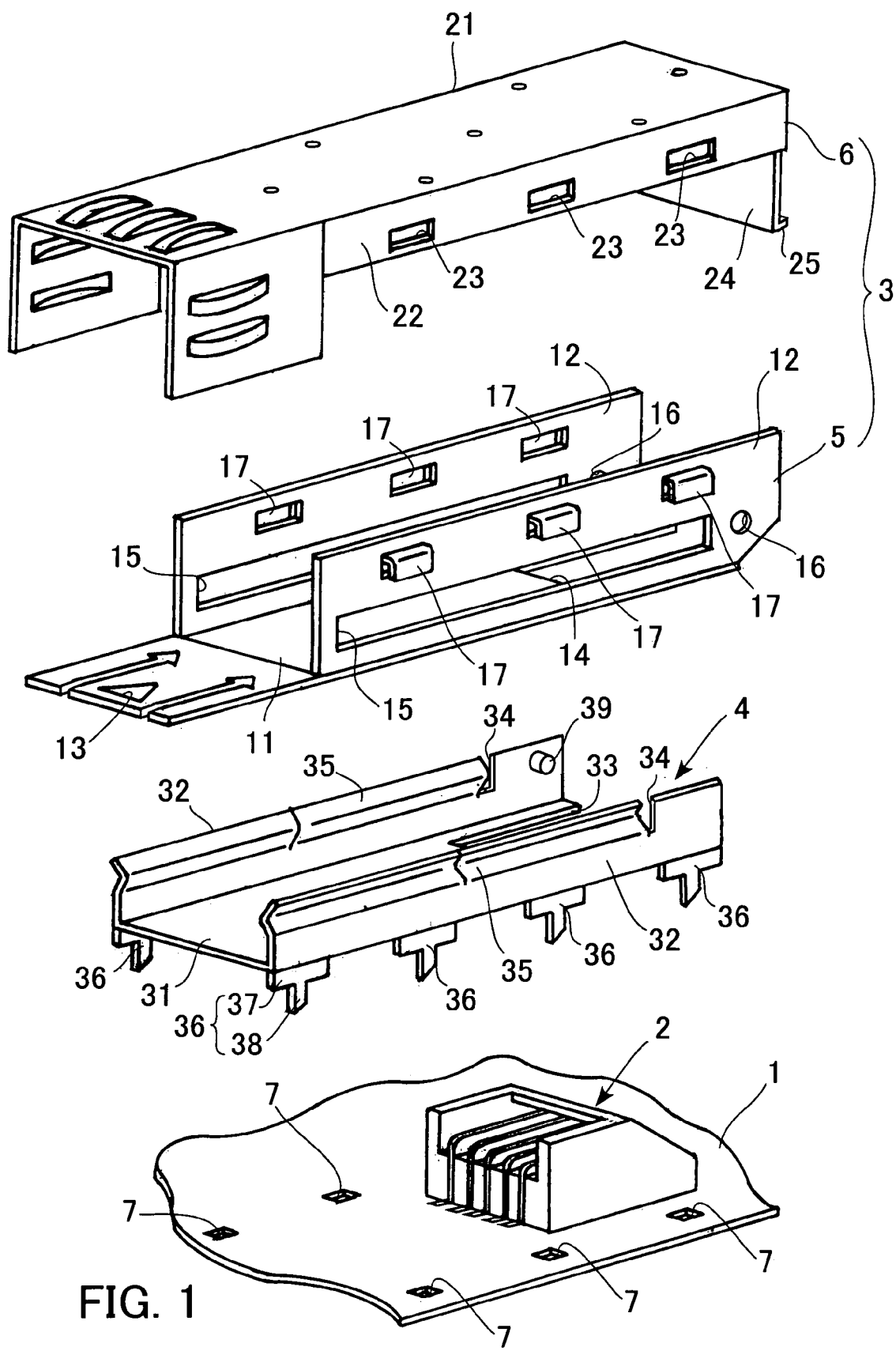
FIG. 1 is an exploded perspective view schematically showing an SFP module mounting structure according to an embodiment of the invention.

Preferred embodiments of the present invention will be described below with reference to the accompanying drawings. FIG. 1 is an exploded perspective view schematically showing an SFP module mounting structure according to an embodiment. In the following description, direction-related terms such as "upper" and "lower" are used as needed in accordance with the orientations of the drawings for convenience sake.

An SFP module of the embodiment is an optical transceiver for use in high-speed optical communications and is set on a network interface card which is mounted on a communication device, not shown. Optical fiber cables are attached to/detached from the SFP module.

The SFP module is mounted on a printed wiring board 1 for communication circuitry which constitutes the network interface card. Specifically, the SFP module mounting structure includes a connector 2 mounted on a surface of the printed wiring board 1, a holder 3 for guiding the SFP module toward the connector, and a base 4 constituting a swing mechanism for swingably supporting the holder 3 with respect to the printed wiring board 1.

The holder 3 includes a lower holder 5 on which the SFP module is placed, and an upper holder 6 which is combined with the lower holder 5 to cooperatively form a hollow member for receiving the SFP module therein.

The lower holder 5 has a rectangular bottom wall 11 having opposite side edges extending in a longitudinal direction thereof, and rectangular side walls 12 extending upward from the respective side edges of the bottom wall 11. The bottom wall 11 has a front end portion (located on the left in the figure) extending frontward beyond the front edges of the side walls 12, and a triangular fitting hole 13 for receiving an engaging portion (described later) of the SFP module is formed in the front end portion. Also, a slit 14 is formed in a rear portion (located on the right in the figure) of the bottom wall 11 so as to allow the connector 2 to be situated therein. Each side wall 12 has a rectangular hole 15 formed in a lower half thereof and extending in the longitudinal direction. A pivot hole 16 as a pivotal element is formed in each side wall at a location rearward of the corresponding hole 15. Further, each side wall 12 has three claws 17 protruding from an upper half thereof and spaced from each other at a predetermined interval in the longitudinal direction. The claws 17 are formed by partly punching the side wall 12 outward and then bending the projecting portions downward. Also, the lower portion of the rear end of each side wall 12 is cut away, thus forming a tapered portion, so as not to interfere with swinging movement of the lower holder 5 about the pivot holes 16.

The upper holder 6 has a rectangular top wall 21 having opposite side edges extending in a longitudinal direction thereof, and rectangular side walls 22 extending downward from the respective side edges of the top wall 21. Front end portions of the side walls 22 have lower edges located at a lower level that those of the remaining portions and have a height substantially equal to that of the side walls 12 of the lower holder 5. The front end portion of the upper holder cooperates with the frontward projecting portion of the bottom wall 11 of the lower holder 5 to form an opening through which the SFP module is inserted into and pulled out of the holder 5. Each side wall 22 has three holes 23 spaced from each other at the predetermined interval in the longitudinal direction. Also, the top wall 21 has a rectangular stopper 24 extending downward from a rear edge thereof. The stopper 24 has a distal end portion bent outward nearly at a right angle thereto, to form an abutting surface 25 which comes into contact with the printed wiring board 1 (as described in detail later).

Figure 2:
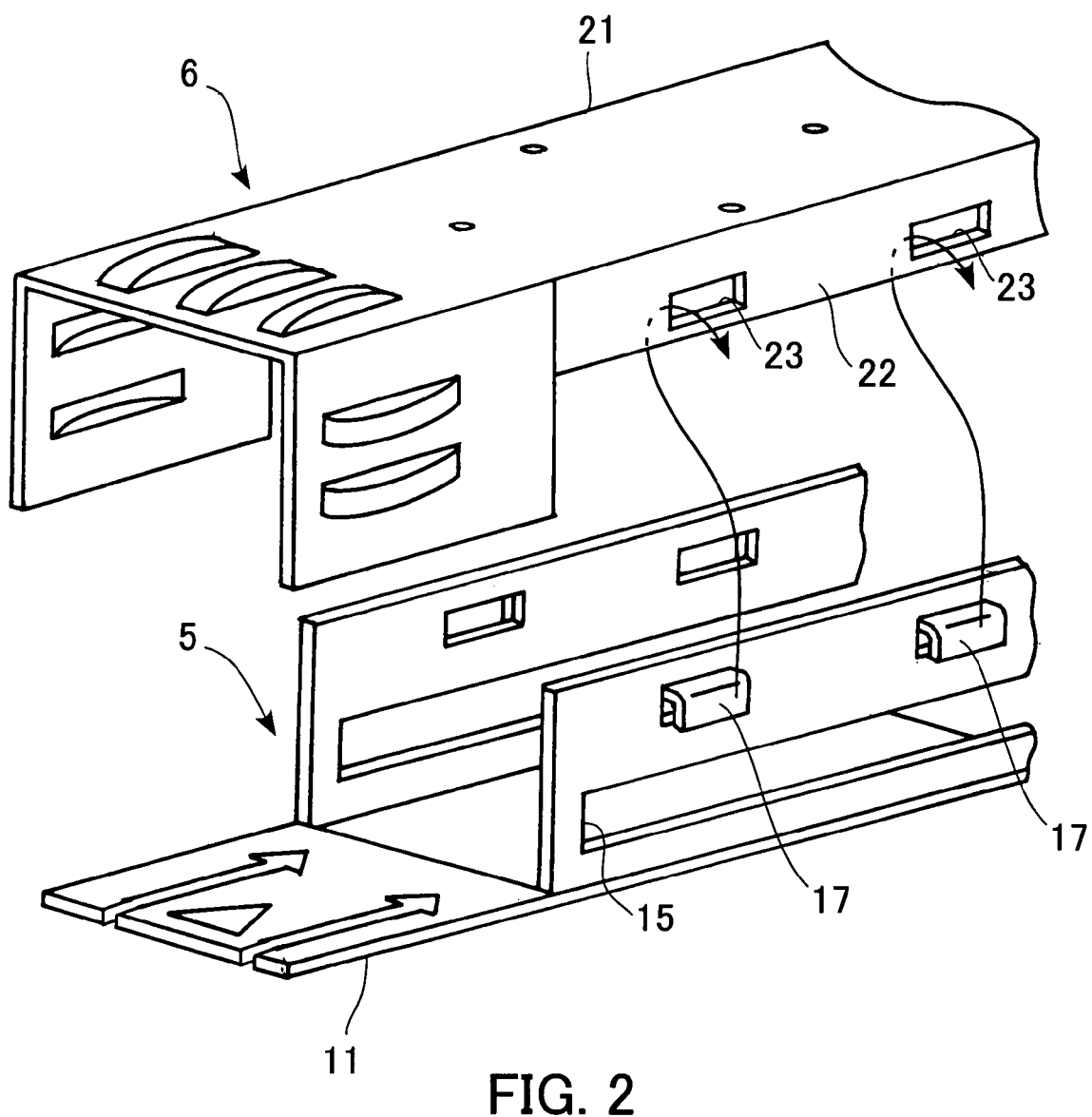
FIG. 2 is an exploded perspective view of a part of a holder, illustrating the manner of how the holder is assembled.

FIG. 2 is an exploded perspective view showing the manner of how the holder is assembled.

The lower and upper holders 5 and 6 are combined together such that the upper holder 6 covers the lower holder 5. At this time, the claws 17 of the lower holder 5 are engaged with the respective holes 23 of the upper holder 6 from inside, as indicated by the arrows in the figure, whereby the lower and upper holders 5 and 6 are fixed to each other. As illustrated, each claw 17 is bent downward and has a rounded corner at its upper edge. Accordingly, as the upper holder 6 placed over the lower holder 5 is pushed downward, the holders are elastically deformed and then are restored from the elastic deformation, so that the holders can be combined together with ease. This completes the assembling of the hollow holder 3 with a rectangular cross section.

To separate the lower and upper holders 5 and 6 from each other, the claws 17 engaged with the holes 23 are pushed inward and then the lower and upper holders 5 and 6 are pulled apart.

Referring again to FIG. 1, the base 4 has a rectangular bottom wall 31 having opposite side edges extending in a longitudinal direction thereof, and rectangular side walls 32 extending upward from the respective side edges of the bottom wall 31. The bottom wall 31 has a slit 33 formed in a rear portion thereof for allowing the connector 2 to be situated therein. Each side wall 32 has a slit 34 of a small width formed in the vicinity of a rear end thereof and having a depth approximately half the height thereof. A front portion of each side wall located frontward of the slit 34 constitutes an engaging ridge 35 (as an example of "fixing means") for fixing the holder 3 in position, and a rear portion of each side wall located rearward of the slit 34 constitutes the swing mechanism for swingably supporting the holder 3. The engaging ridges 35 are adapted to fit in the respective holes 15 of the lower holder 5 from outside.

Also, four legs 36 protrude downward from each of the side edges of the bottom wall 31 and are spaced from each other at a predetermined interval in the longitudinal direction. Each leg 36 has a stepped shape having a wide base 37 coupled to the bottom wall 31 and a narrow insertion portion 38 extending downward from a central portion of the base. The insertion portions 38 are press-fitted into respective through holes 7 formed in the printed wiring board 1 or soldered to the board 1 after insertion mounting. Consequently, a predetermined space is provided between the base 4 and the printed wiring board 1.

Further, each side wall 32 has a protuberance 39, as a pivotal element, protruding inward from a portion thereof located rearward of the slit 34. When the holder 3 and the base 4 are combined together, the protuberances 39 are inserted into the respective pivot holes 16 of the lower holder 5 and thus serve as pivots for the holder 3.

Figure 3:
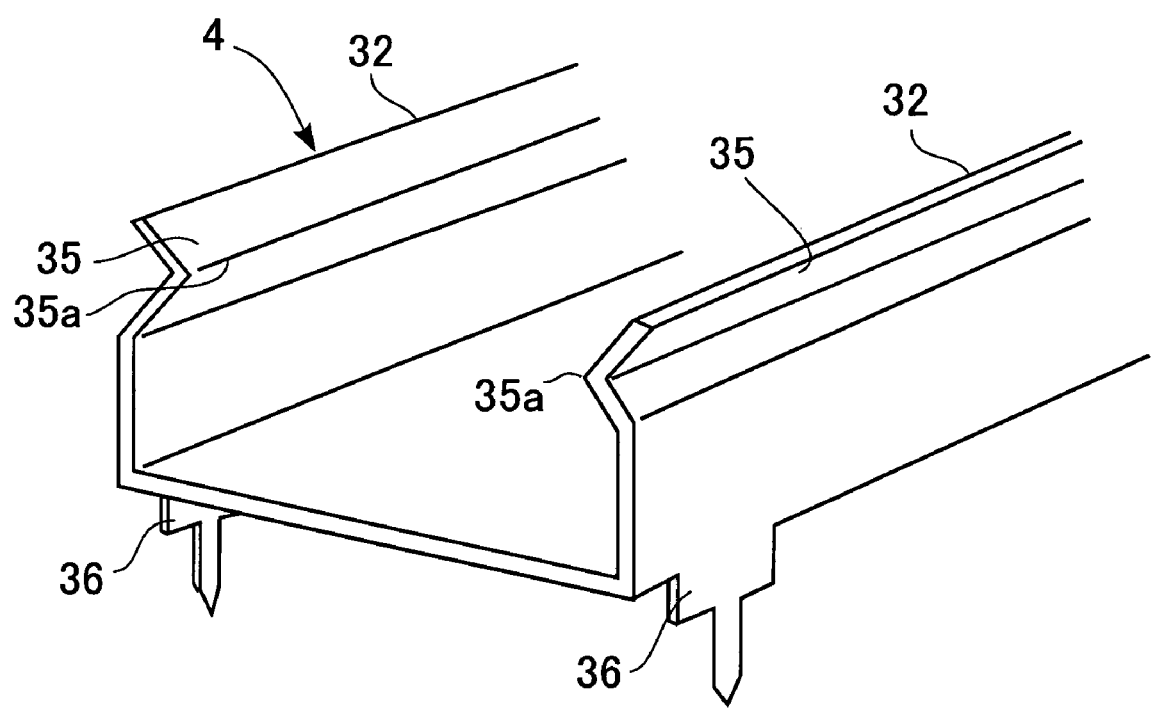
FIG. 3 is a perspective view showing a part of a base in detail.

FIG. 3 is a perspective view showing a part of the base in detail.

As shown in the figure, each engaging ridge 35 of the base 4 is formed by bending the upper half of the corresponding side wall 32 into the shape "<", as viewed in cross section, such that the engaging ridge 35 has a crested portion 35a protruding inward from the flat portion of the side wall 32.

FIGS. 4A and 4B illustrate the manner of how the lower holder and the base are combined, wherein FIG. 4A is a side view showing the rear portion of the lower holder and of the base, and FIG. 4B is a rear view of the lower holder and the base. In each figure, the upper part shows the lower holder and the lower part shows the base.

To pivotally connect the base 4 and the lower holder 5, first, the rear portions of the side walls 32 of the base 4 where the protuberances 39 are located are pushed outward away from each other, as indicated by the dashed arrows, and while in this state, the rear end of the lower holder 5 is inserted in between the rear portions of the side walls 32. At this time, the protuberances 39 are inserted into the respective pivot holes 16 of the lower holder 5, as indicated by the solid arrows. Consequently, the protuberances 39 are rotatably supported by the pivot holes 16, permitting the lower holder 5 to swing relative to the base 4.

Figure 5A:
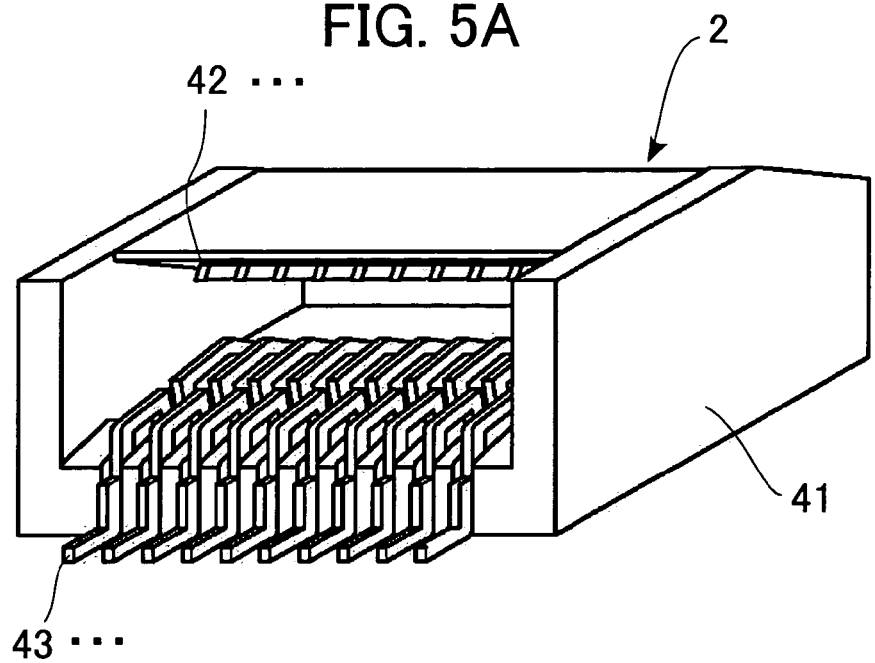
FIGS. 5A, 5B and 5C show the structure of a connector.
Figure 5B:
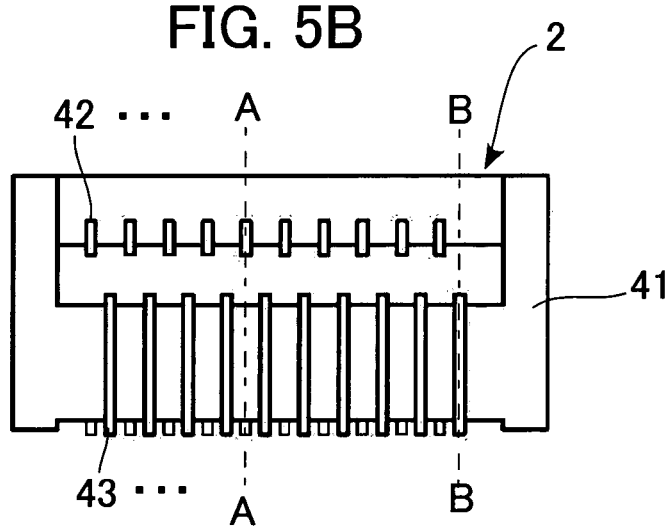
Figure 5C:
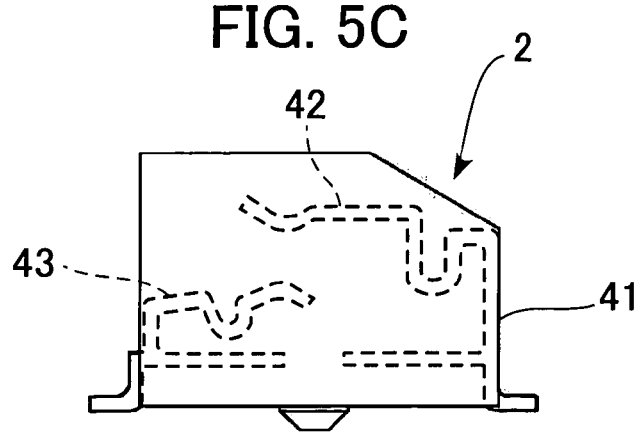

FIGS. 5A, 5B and 5C illustrate the structure of the connector, wherein FIG. 5A is a perspective view of the connector, FIG. 5B is a front view of the connector, and FIG. 5C is a side view of the connector.

The connector 2 has a housing 41 which is made by resin molding with a row of positive electrodes 42 and a row of negative electrodes 43 arranged therein. The electrodes of the connector 2 are connected to a wiring pattern, not shown, of the printed wiring board 1.

The electrodes 42 and 43 are securely supported, like cantilevers, by upper and lower portions of the housing 41, respectively, and have distal end portions extending obliquely and nearly parallel with each other. When the SFP module is connected to the connector 2, the distal end portions of these electrodes come into resilient contact with respective electrode terminals at the distal end of the SFP module.

Figure 6A:
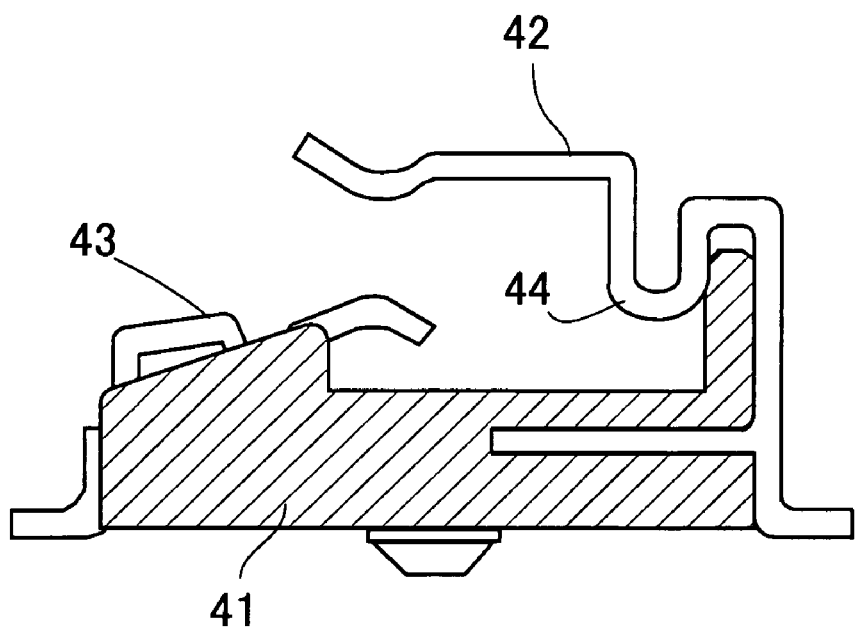
FIGS. 6A and 6B are sectional views also showing the structure of the connector.
Figure 6B:
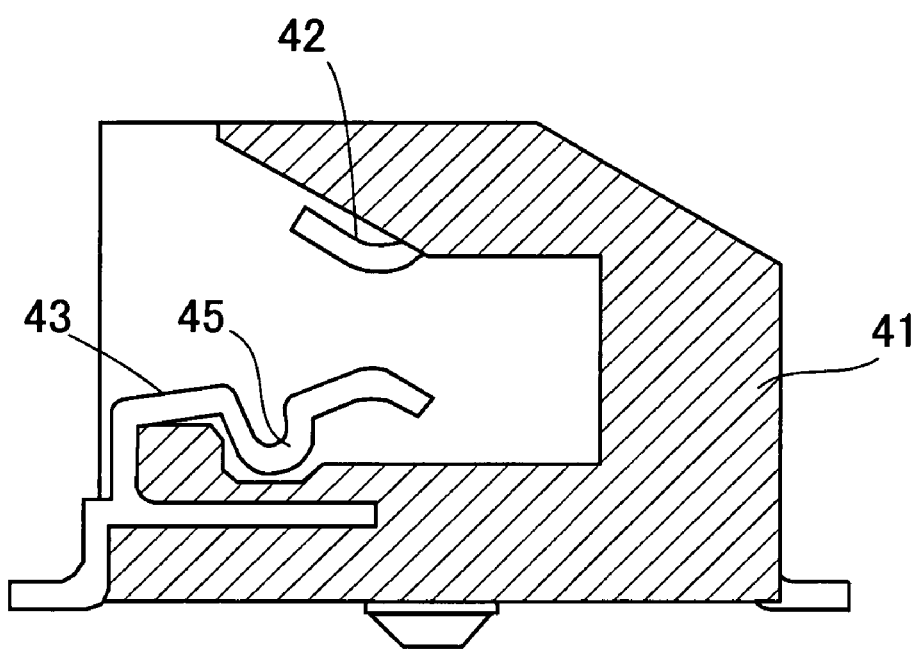

FIGS. 6A and 6B are sectional views showing the structure of the connector, wherein FIG. 6A is a sectional view taken along line A—A in FIG. 5B, and FIG. 6B is a sectional view taken along line B—B in FIG. 5B.

As illustrated, each electrode 42 extends frontward from the rear wall of the connector 2 and has a bent portion 44 adjacent to the rear wall. When the electrode 42 is pushed from the front, the bent portion 44 is pressed against the rear wall and produces a spring force resisting the pushing force. Since the distal end portion of the electrode 42 is inclined obliquely, the produced spring force turns into a reaction force of the distal end portion acting obliquely upward.

On the other hand, each electrode 43 extends rearward from the front wall of the connector 2 and has a bent portion 45 near the front wall. The bent portion 45 is located in the vicinity of the inside bottom surface of the connector 2. When the electrode 43 is pushed from the front, the bent portion 45 abuts against the inside bottom surface and produces a spring force resisting the pushing force. Since the distal end portion of the electrode 43 is inclined obliquely, the produced spring force turns into a reaction force of the distal end portion acting obliquely upward.

Figure 7:
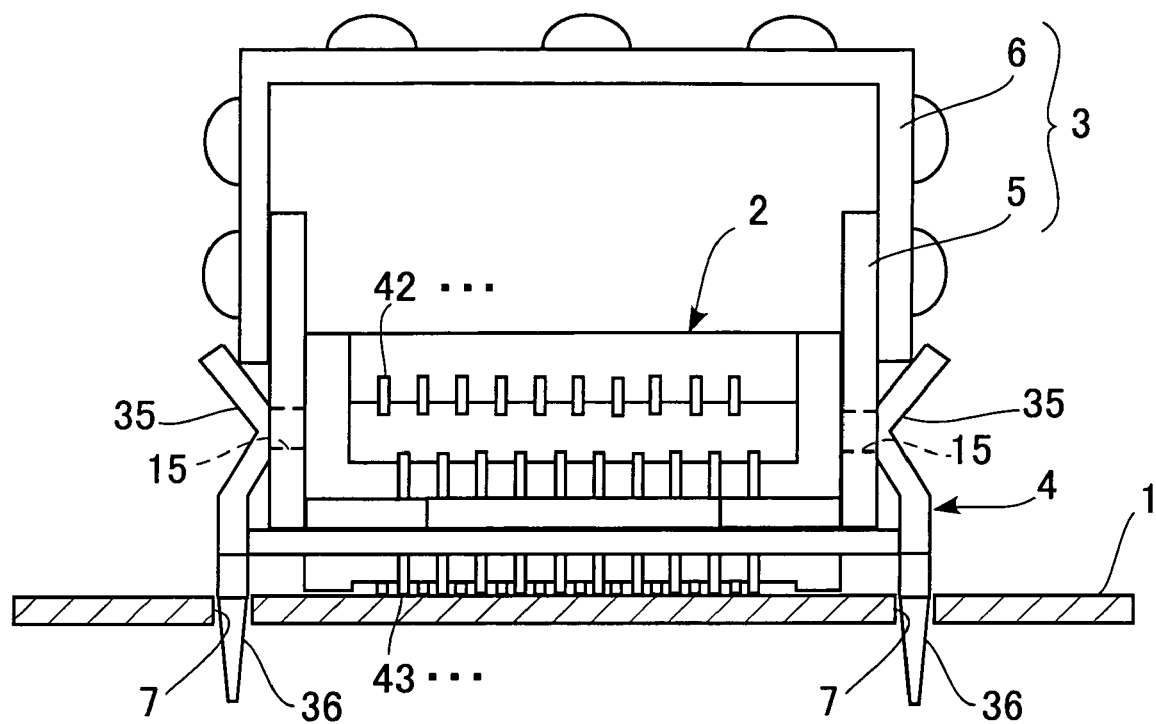
FIG. 7 is a front view showing a state wherein the connector, the base and the holder are attached to a printed wiring board.

FIG. 7 is a front view showing the connector, the base and the holder mounted on the printed wiring board.

The connector 2, the base 4 and the holder 3 are mounted on the printed wiring board 1 in the aforementioned manner, and the resultant structure has a double flooring made up of the base 4 and the lower holder 5, as illustrated. The base 4 is fixed on the printed wiring board 1, and the assembled holder 3 is stably fixed to the base 4 with the engaging ridges 35 of the base 4 received in the respective holes 15 of the lower holder 5.

A method of mounting the SFP module will be now described. FIGS. 8 through 12 illustrate a process of mounting the SFP module, and FIGS. 13 to 16 illustrate the mounting process in detail.

Figure 8:
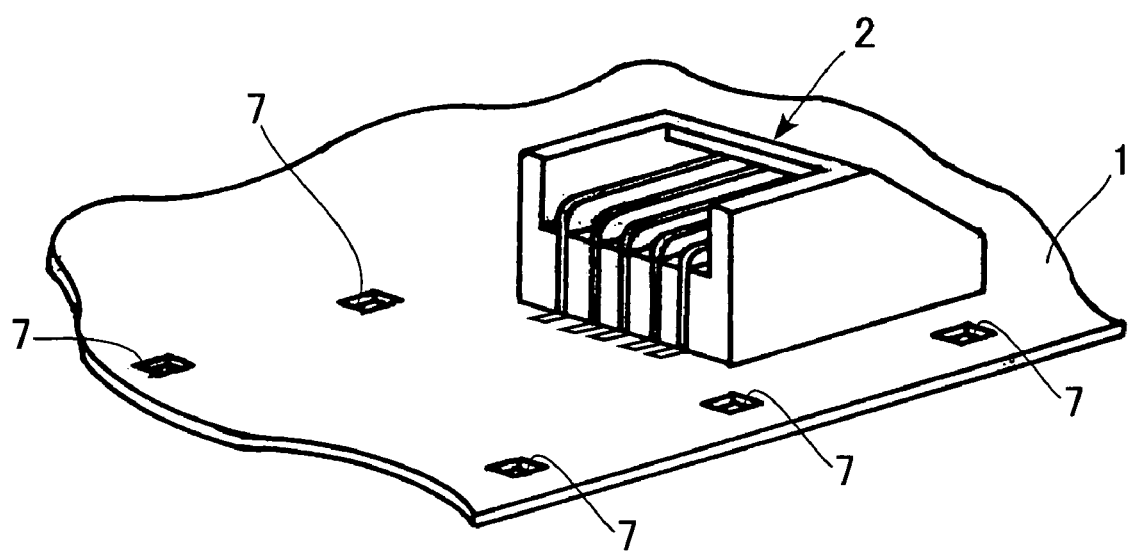
FIG. 8 illustrates a process of mounting an SFP module.

When mounting the SFP module, first, the connector 2 is mounted on the printed wiring board 1, as shown in FIG. 8. A solder pad, not shown, is previously formed at a predetermined position of the printed wiring board 1, and the connector 2 is mounted by reflow soldering or the like.

Figure 9:
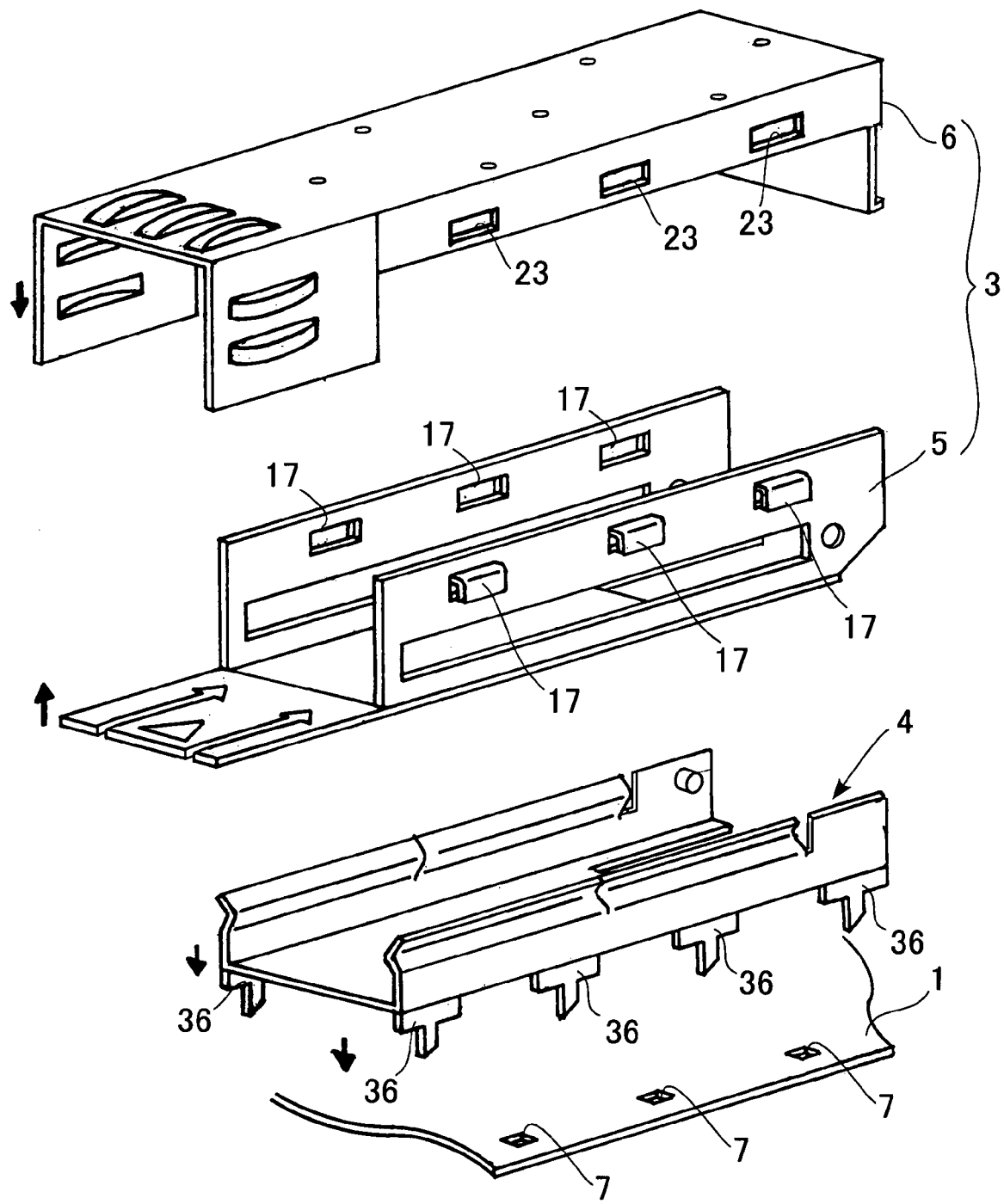
FIG. 9 illustrates the SFP module mounting process.

Subsequently, as shown in FIG. 9, the base 4 is attached to the printed wiring board 1 such that the connector 2 is situated inside the base 4, and the upper and lower holders 6 and 5 are combined together to form the holder 3. The base 4 is fixed on the printed wiring board 1 with its legs 36 inserted into the respective through holes 7 of the printed wiring board 1. The holder 3 is assembled by causing the claws 17 of the lower holder 5 to engage with the respective holes 23 of the upper holder 6 from inside, as stated above.

Figure 10:
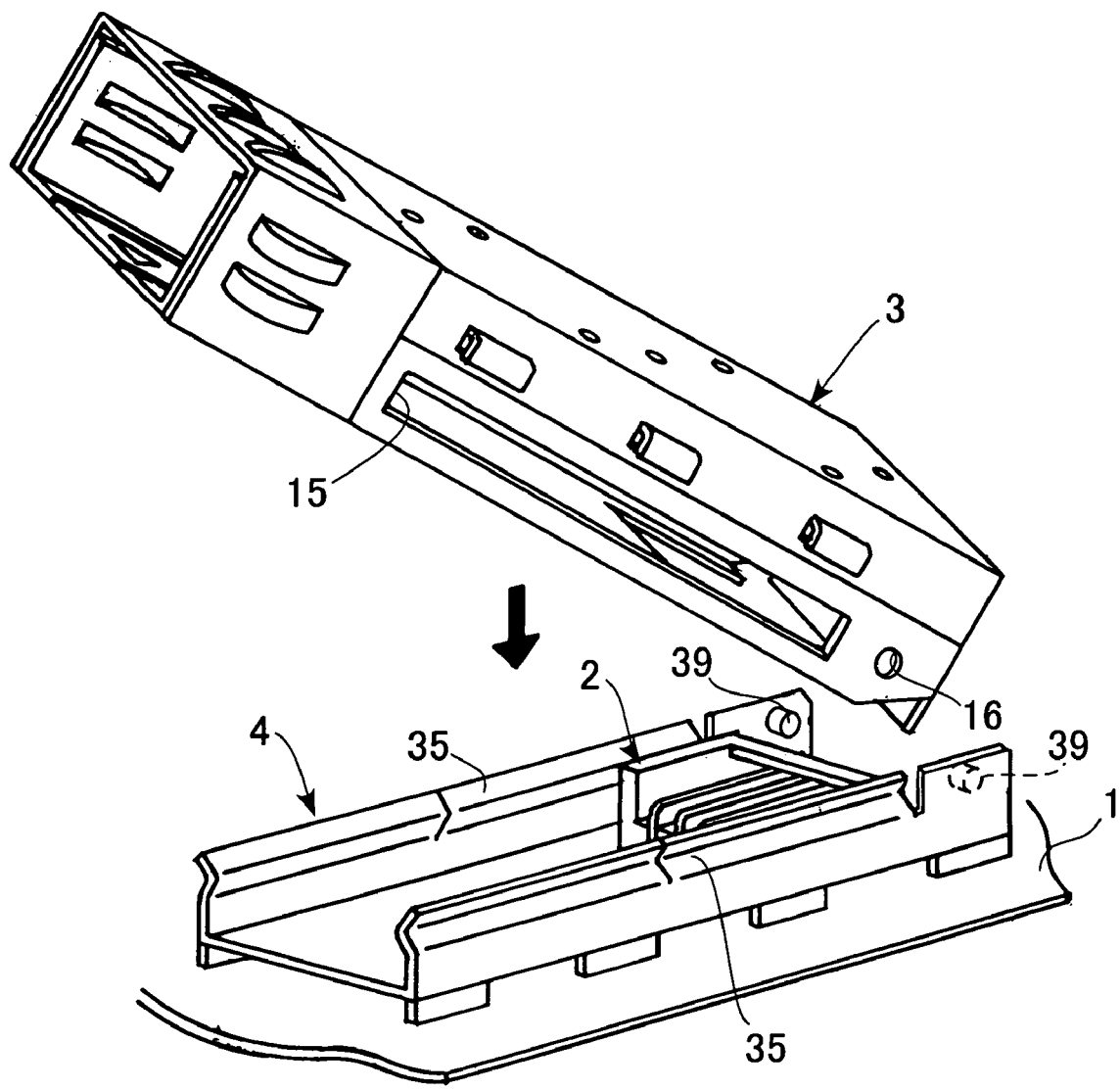
FIG. 10 illustrates the SFP module mounting process.

Then, as shown in FIG. 10, the holder 3 is attached to the base 4. Specifically, the holder 3 is swingably attached to the base 4 with the protuberances 39 of the base 4 inserted into the respective pivot holes 16 of the lower holder 5, as stated above. At this time, the holder 3 may be kept in an obliquely raised state relative to the printed wiring board 1 so that the SFP module can be mounted with ease.

Figure 13:
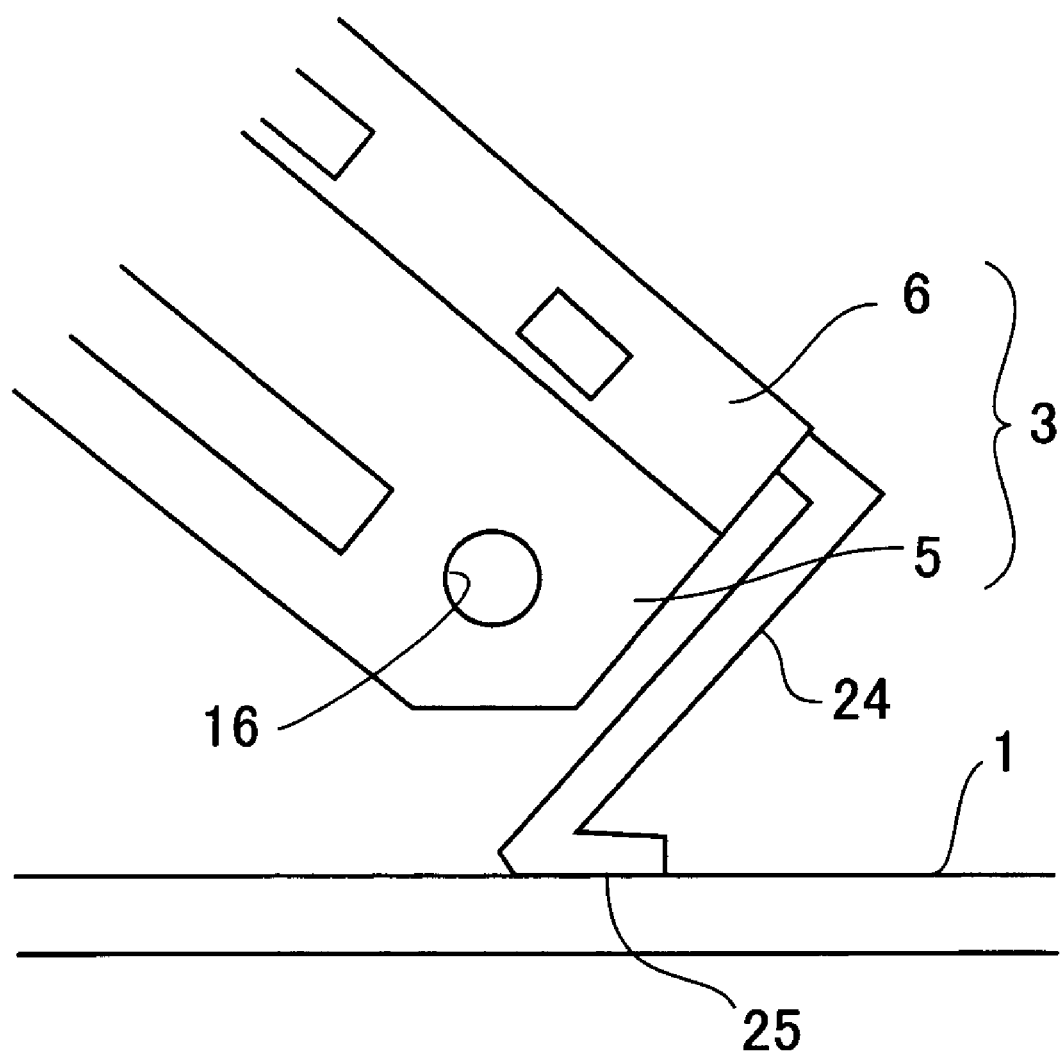
FIG. 13 illustrates the mounting process in detail.
Figure 14:
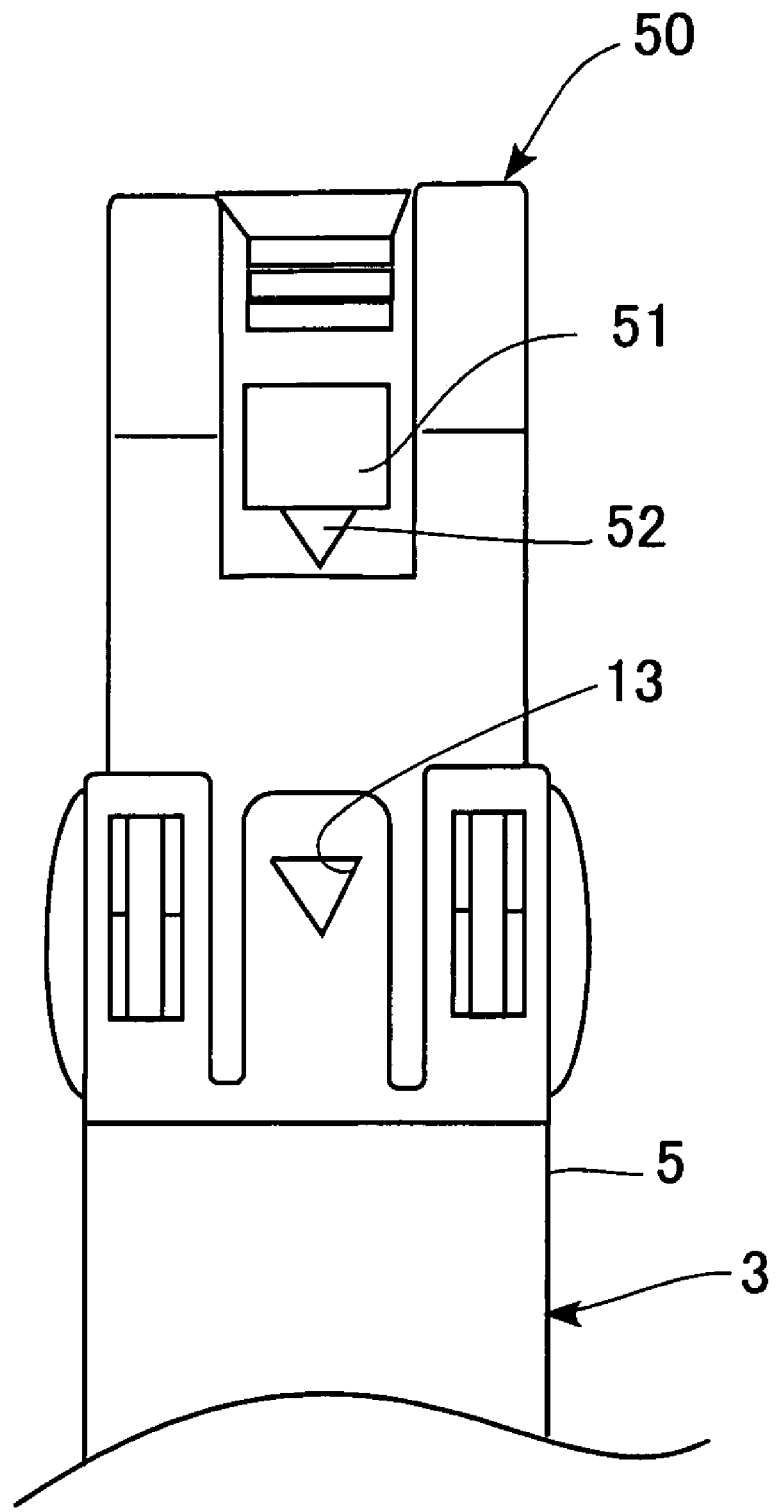
FIG. 14 illustrates the mounting process in detail.

In this case, the holder 3 is swung about the pivot holes 16 in a direction away from the printed wiring board 1, as shown in FIG. 13 (in which the base 4 is omitted), but since the abutting surface 25 of the stopper 24 extending from the upper holder 6 thereafter comes into contact with the printed wiring board 1, the holder 3 cannot be swung further beyond the position where the stopper 24 abuts against the printed wiring board 1. Thus, the holder 3 is prevented from being swung in a direction away from the printed wiring board 1 past a predetermined angle, and this makes it easy to hold the holder 3 when the SFP module is inserted. It is also possible to avoid the situation where the holder 3 falls on and damages the other module mounted at the rear of the holder.

Figure 11:
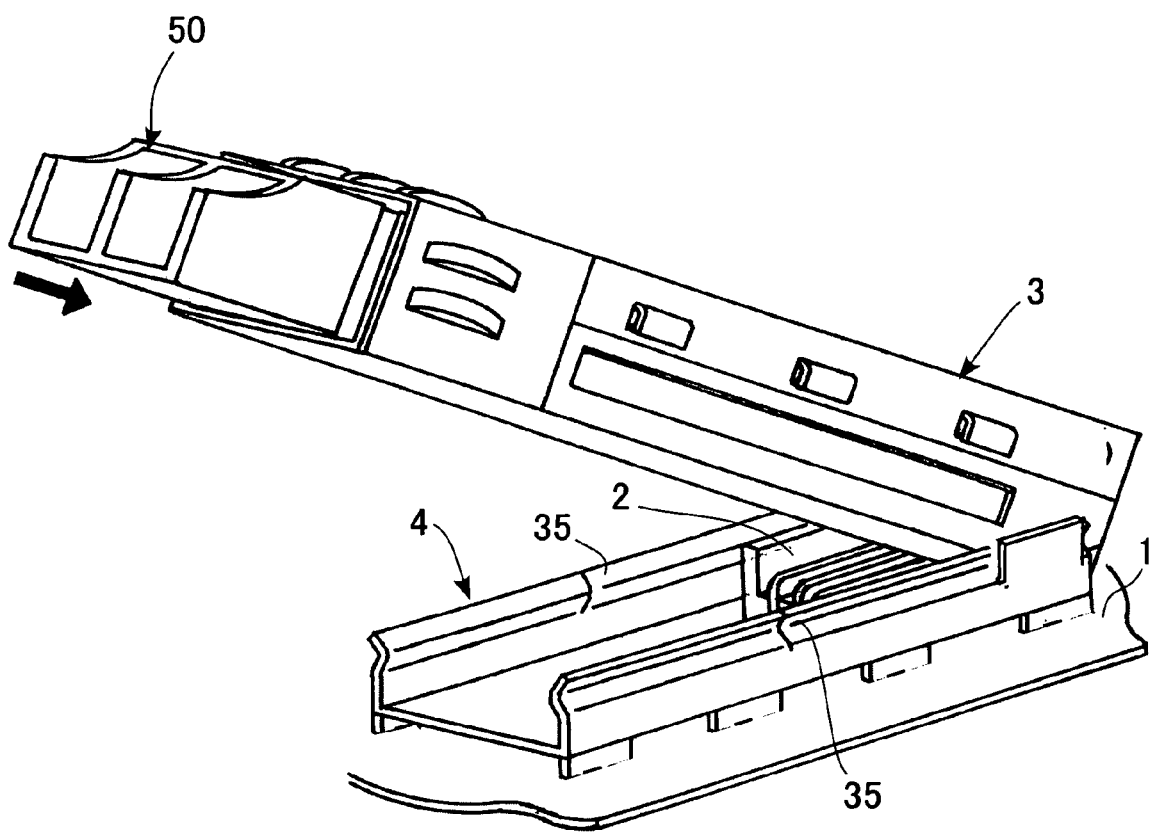
FIG. 11 illustrates the SFP module mounting process.
Figure 16A:
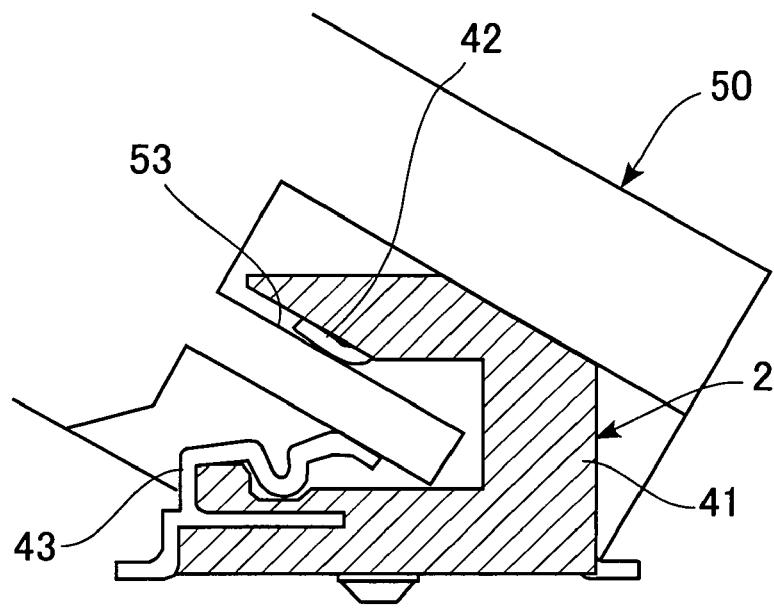
FIGS. 16A and 16B illustrate the mounting process in detail.

Subsequently, as shown in FIG. 11, the SFP module 50 is inserted from the open end of the holder 3. At this time, a protuberance 52 of the engaging portion 51, shown in the bottom view of FIG. 14, which is formed at the front end portion of the SFP module 50 opposite the connector 2, fits in the fitting hole 13 of the lower holder 5, whereby the SFP module 50 is fixed in position relative to the holder 3. Also, as shown in FIG. 16A, a terminal section 53 formed at the rear end of the SFP module 50 is inserted between the electrode rows of the connector 2. A plurality of electrode terminals are formed on each of upper and lower surfaces of the terminal section 53 and are brought into contact with corresponding ones of the electrodes 42 and 43. The electrodes 42 and 43 contact with the respective electrode terminals of the terminal section 53 with a predetermined contact pressure.

Figure 12:
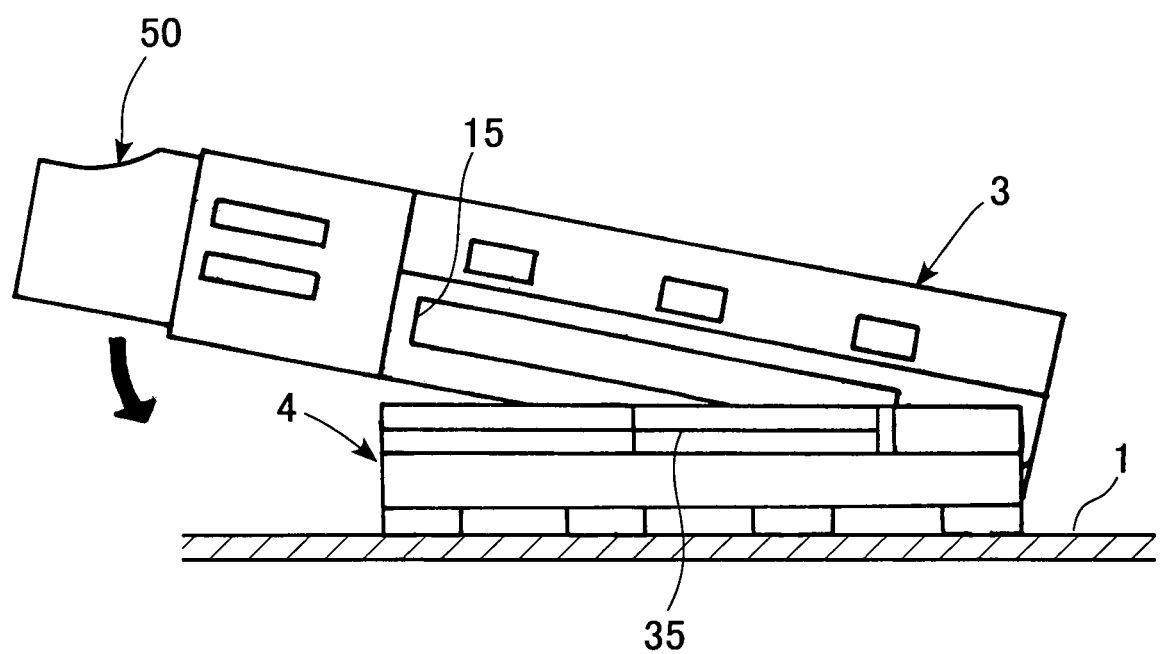
FIG. 12 illustrates the SFP module mounting process.
Figure 15A:
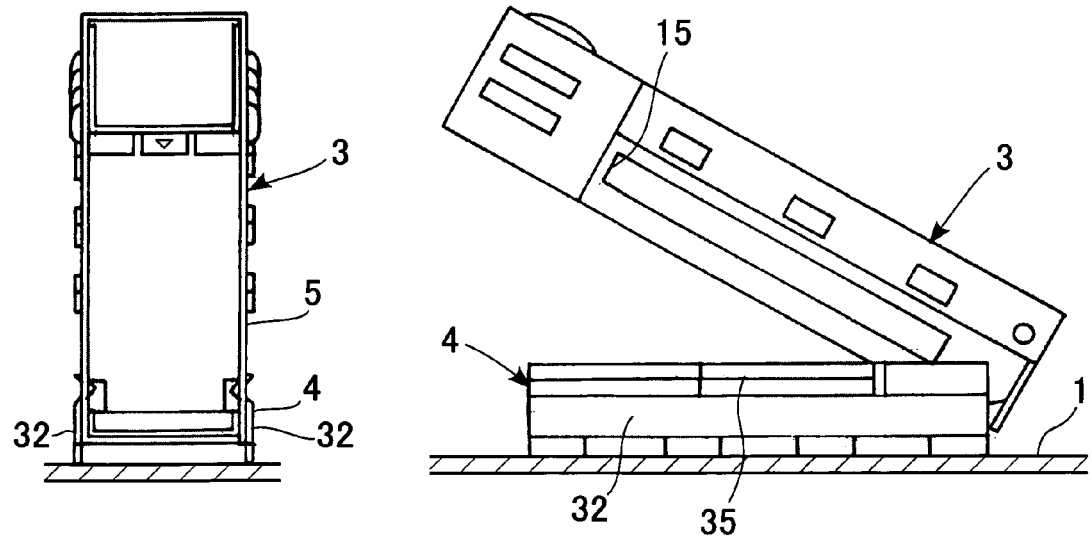
FIGS. 15A, 15B and 15C illustrate the mounting process in detail.
Figure 15B:
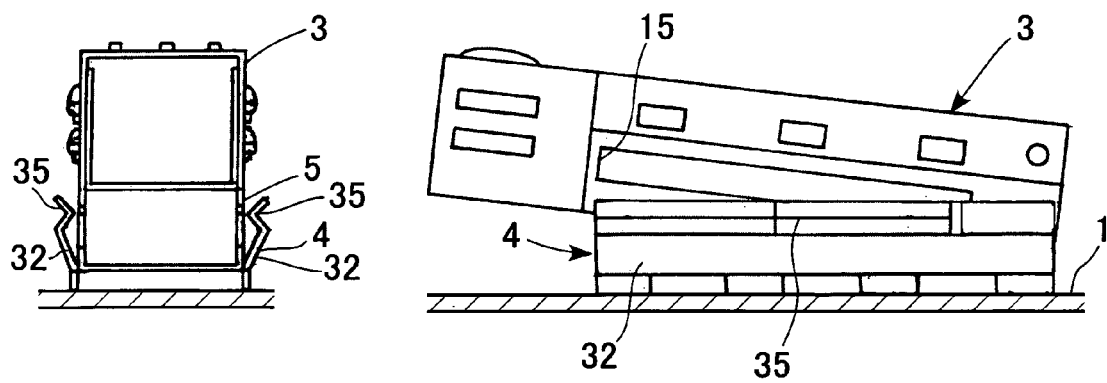
Figure 15C:
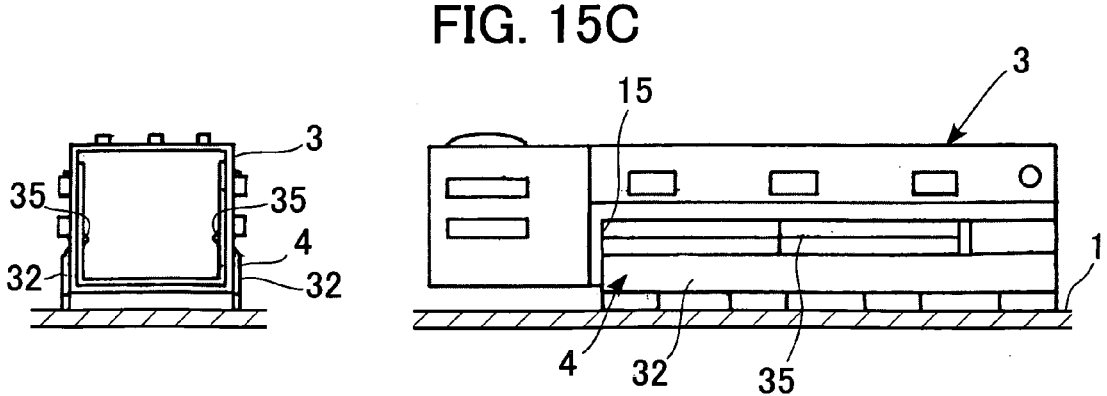

Then, as shown in FIG. 12, the holder 3 is swung about the pivots in a direction toward the printed wiring board 1. The manner of how the holder 3 is swung at this time is illustrated in FIGS. 15A, 15B and 15C (in which the SFP module 50 is omitted). As shown in FIGS. 15A to 15C, the SFP module 50 gradually approaches the printed wiring board 1 as the holder is swung. In each figure, the left part is a front view and the right part is a side view.

Specifically, as the holder 3 is swung from the state shown in FIG. 15A to the state shown in FIG. 15B, the lower holder 5 pushes the base 4 outward. At this time, the engaging ridges 35 are elastically deformed outward together with the side walls 32, but as the holder 3 is further swung into the state shown in FIG. 15C, the engaging ridges 35 fit in the respective holes 15 due to the elasticity of the side walls 32. As a result, the side walls 32 are restored to their original state.

Figure 16B:
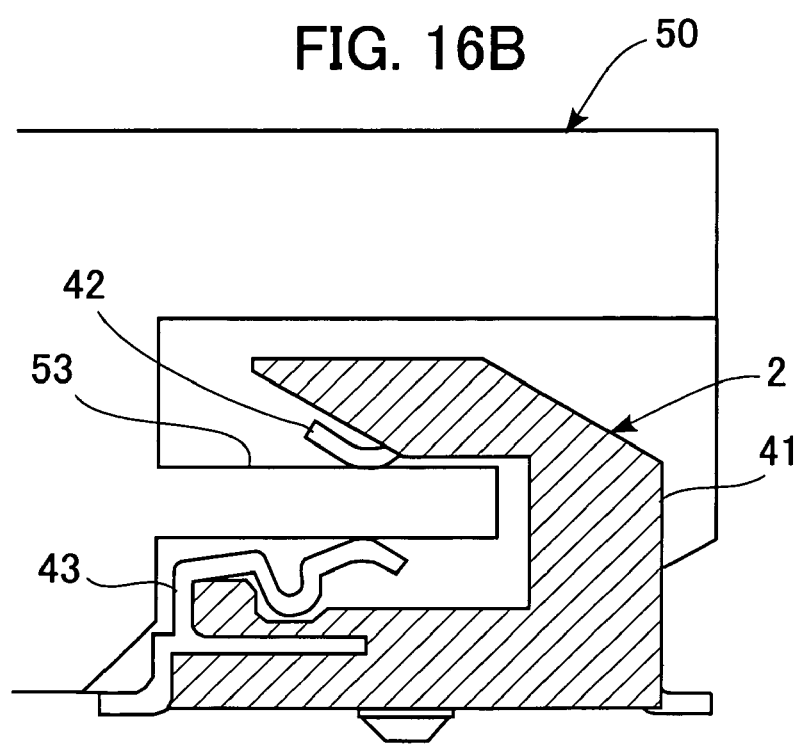

Also, in this case, the terminal section 53 of the SFP module 50 is also similarly swung to a position parallel with the printed wiring board 1, as shown in FIG. 16B. Even in this state, the connection between the electrodes and the electrode terminals is maintained because of the spring properties (elastic force) of the electrodes 42 and 43.

Figure 17:
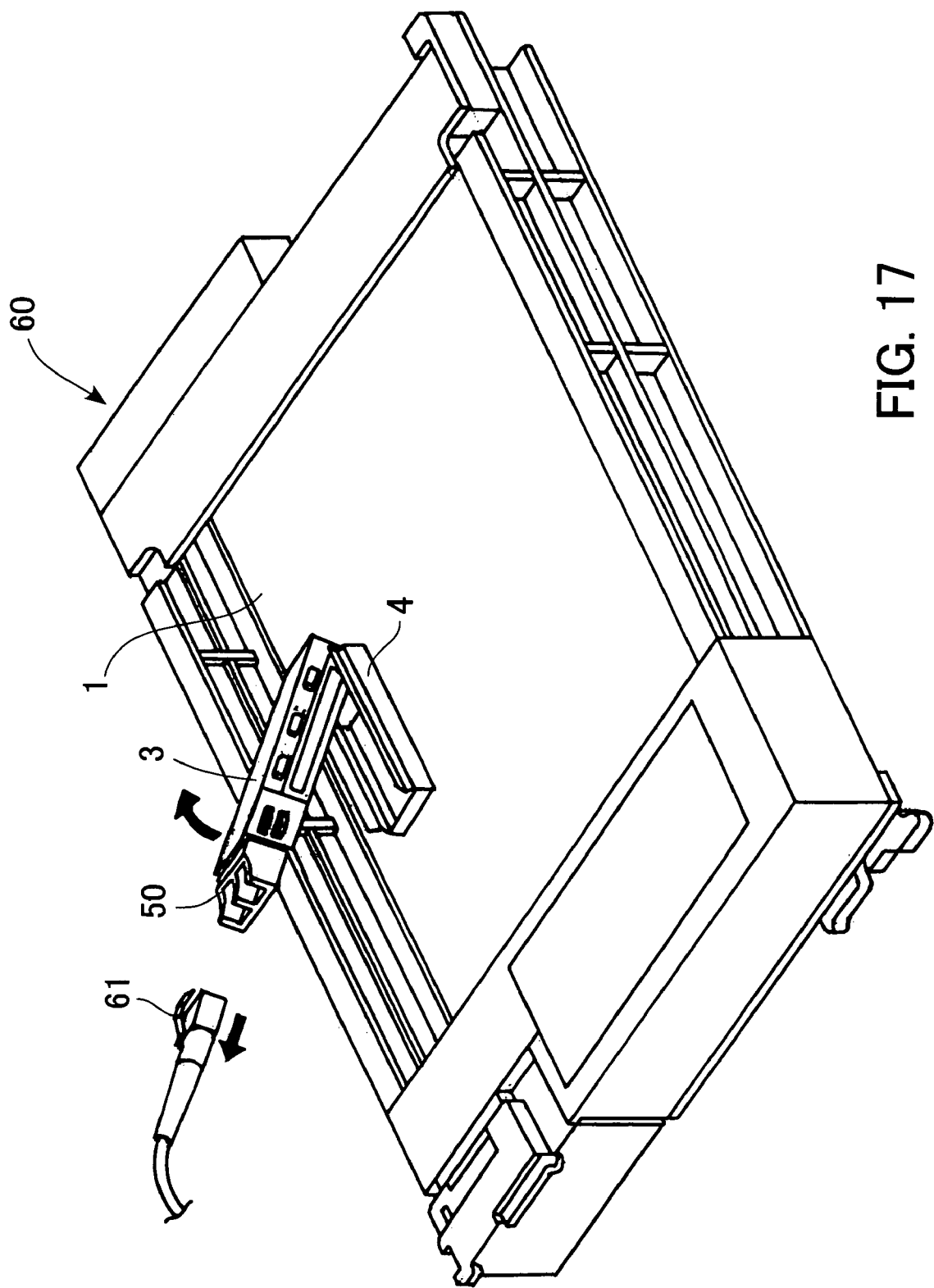
FIG. 17 shows an exemplary arrangement of a network interface card to which the SFP module mounting structure of the embodiment is applied, and also illustrates the manner of how the SFP module is detached.
Figure 18:
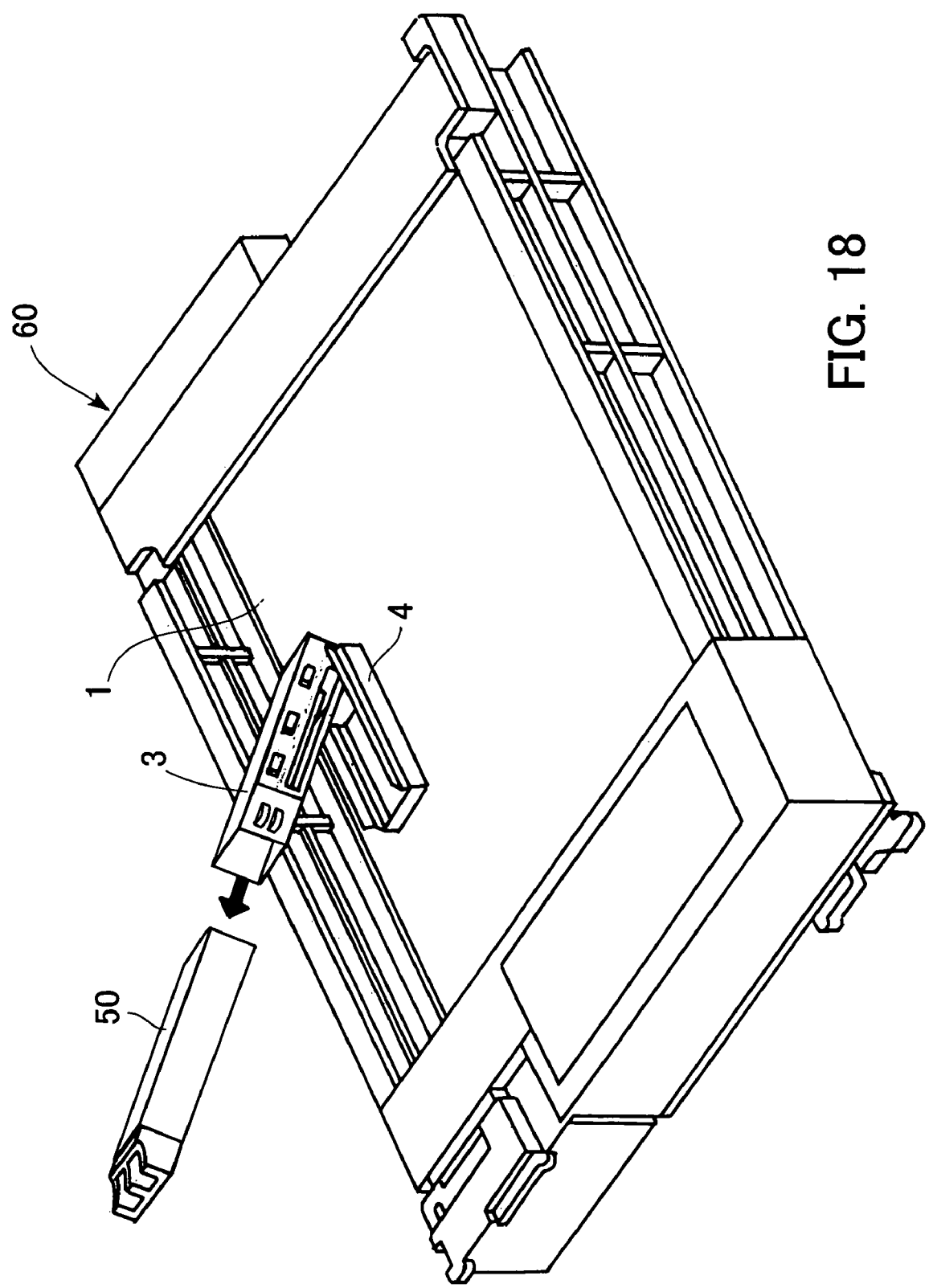
FIG. 18 shows the arrangement of the network interface card to which the SFP module mounting structure of the embodiment is applied, and also illustrates the manner of how the SFP module is detached.

FIGS. 17 and 18 show an exemplary arrangement of a network interface card to which the SFP module mounting structure of the embodiment is applied, and also illustrate a method of detaching the SFP module. The figures illustrate a single SFP module mounting structure.

The SFP module 50 is detached from the network interface card 60 in the manner described below. First, with optical fiber cables 61 attached to the SFP module 50, the holder 3 is raised from the base 4 fixed to the printed wiring board 1, as shown in FIG. 17, thereby releasing the holder from the fixed state.

As the holder 3 is swung about the pivots, the connection ports of the optical fiber cables 61 are raised and directed obliquely upward. While in this state, the optical fiber cables 61 are pulled out of the SFP module 50. At this time, each optical fiber cable 61 is pulled out at a location distant from the printed wiring board 1, and it is therefore unnecessary to take account of the pull stroke of the optical fiber cable 61 unlike the case where the optical fiber cable is pulled out immediately above the printed wiring board 1.

Subsequently, the locking of the SFP module 50 and the holder 3 is released, and the SFP module 50 is pulled out, as shown in FIG. 18. The SFP module 50 is also pulled out at a location remote from the printed wiring board 1; therefore, it is unnecessary to take account of the pull stroke of the SFP module 50 unlike the case where the SFP module is pulled out immediately above the printed wiring board 1.

The SFP module 50 and the optical fiber cables 61 are attached to the mounting structure following the aforementioned steps in reverse order. Specifically, the holder 3 is raised from the base 4 fixed to the printed wiring board 1 to be inclined obliquely, and the SFP module 50 is inserted into and connected to the holder 3. Subsequently, the optical fiber cables 61 are connected to the SFP module 50, and the holder 3 is swung back in a direction toward the printed wiring board 1. The holder 3 is then fixed to the base 4 by means of the engaging ridges 35 (see FIG. 1), whereupon the mounting procedure is completed.

Figure 19:
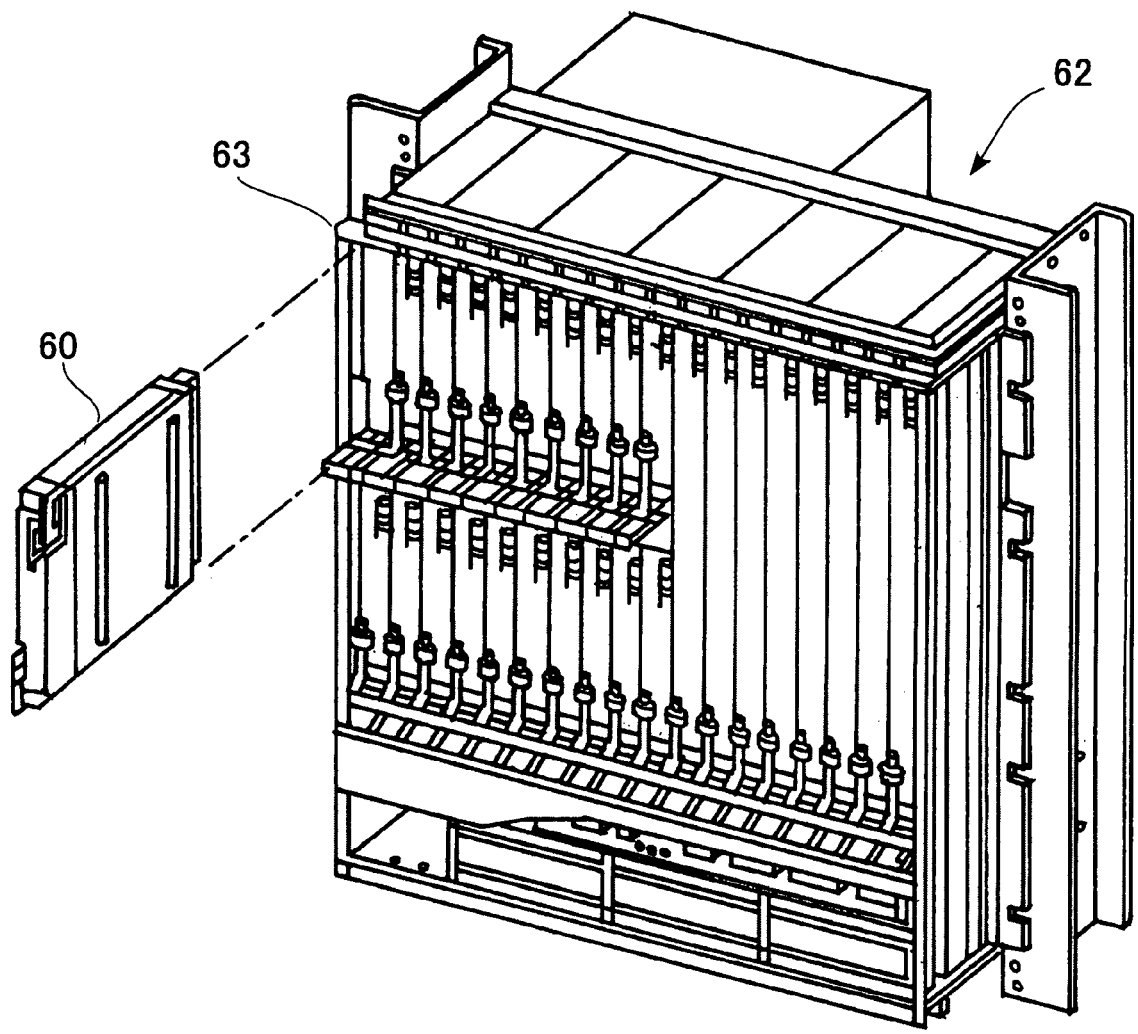
FIG. 19 is a perspective view showing an exemplary arrangement of a communication device on which the network interface card is mounted.

FIG. 19 is a perspective view showing an exemplary arrangement of a communication device on which the network interface card is mounted.

As illustrated, the network interface card 60, to which the SFP modules 50 and the optical fiber cables 61 have been attached in the aforementioned manner, is placed on a predetermined shelf 63 of the communication device 62.

As described above, with the SFP module mounting structure of the embodiment, the swing mechanism constituted by the coupling between the holder 3 and the base 4 permits the holder 3 to swing in directions toward and away from the printed wiring board 1. When the SFP module 50 is mounted, therefore, the SFP module 50 can be inserted with the holder 3 kept in an obliquely raised state relative to the printed wiring board 1. Also, when detaching the SFP module 50, the SFP module 50 can be pulled out with the holder 3 obliquely raised from the printed wiring board 1.

It is therefore unnecessary to provide an extra region on the printed wiring board 1 taking into account the stroke over which the SFP module 50 or the optical fiber cable 61 is moved for attachment/detachment. As a result, the SFP modules 50 can be mounted onto a larger region of the printed wiring board 1 and thus with higher density. Also, the degree of freedom of positioning the SFP modules 50 on the printed wiring board 1 improves.

The SFP module 50 is attached or detached after the holder 3 is obliquely raised from the printed wiring board 1. Thus, although the SFP module 50 has the engaging portion 51 (see FIG. 14) formed on the lower surface thereof for engagement with the holder 3, it is unnecessary to form an escape hole in the printed wiring board 1 for receiving the engaging portion 51. Also, as shown in FIG. 1, each leg 36 of the holder 3 has a stepped shape made up of the base 37 and the insertion portion 38 so that the body of the holder 3 may be separated at a predetermined height from the printed wiring board 1. Consequently, the engaging protuberance 52 (see FIG. 14), which protrudes downward from the SFP module 50, does not interfere with the printed wiring board 1. Also for this reason, the printed wiring board 1 need not be additionally provided with an escape hole.

Namely, it is unnecessary to additionally machine the printed wiring board 1 to form escape holes, thus making it possible to reduce the machining cost. It is also unnecessary to disengage the engaging portion 51 from the underside of the printed wiring board 1, permitting the SFP module 50 to be attached and detached with ease.

Further, since no escape holes need to be formed in the printed wiring board 1, the degree of freedom of wiring can be enhanced.

While the preferred embodiment of the present invention has been described, it is to be noted that the present invention is not limited to the foregoing specific embodiment, and needless to say, various changes and modifications can be made without departing from the spirit and scope of the invention. FIGS. 20A, 20B, 21A and 21B illustrate a modification of the above embodiment.

Figure 21B:
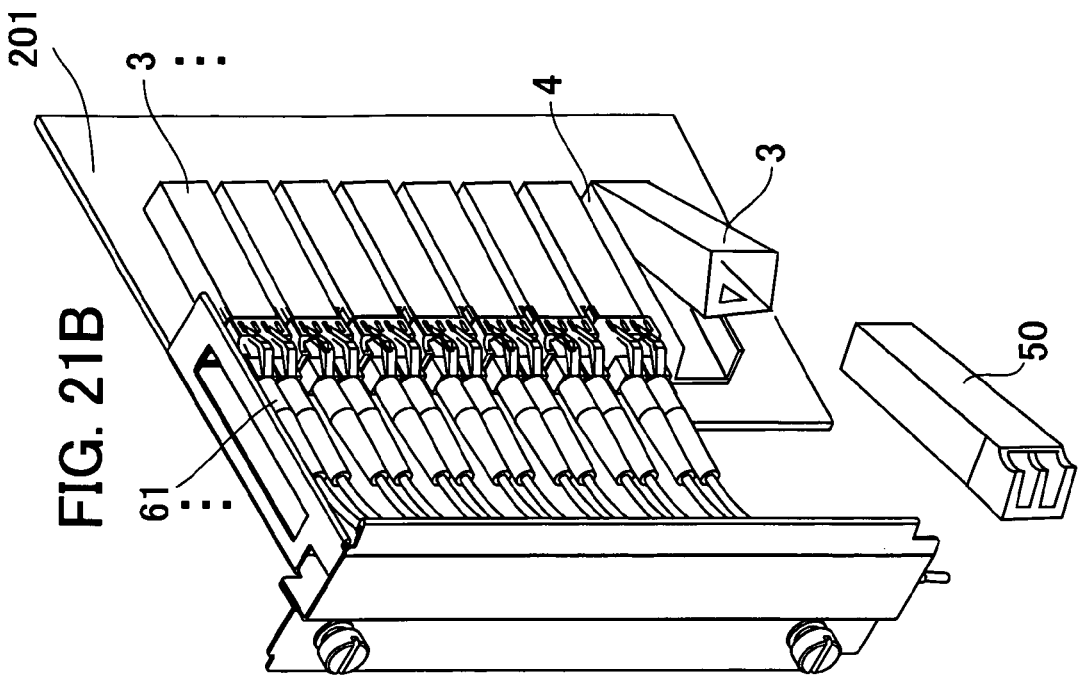
FIGS. 21A and 21B also show the modification of the embodiment.
Figure 21A:
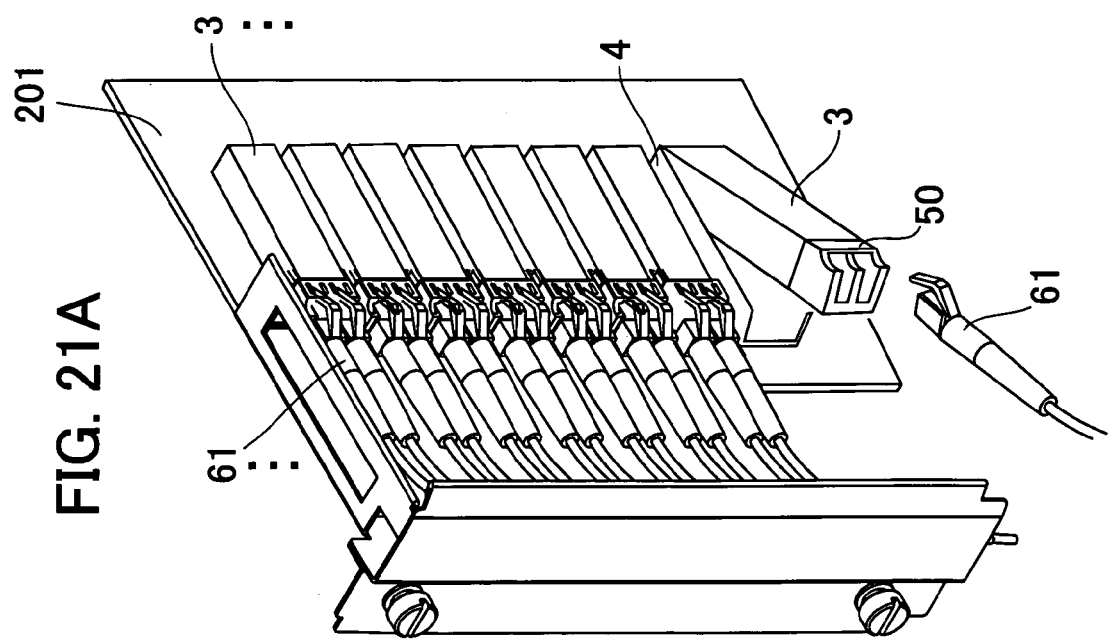
Figure 22A:
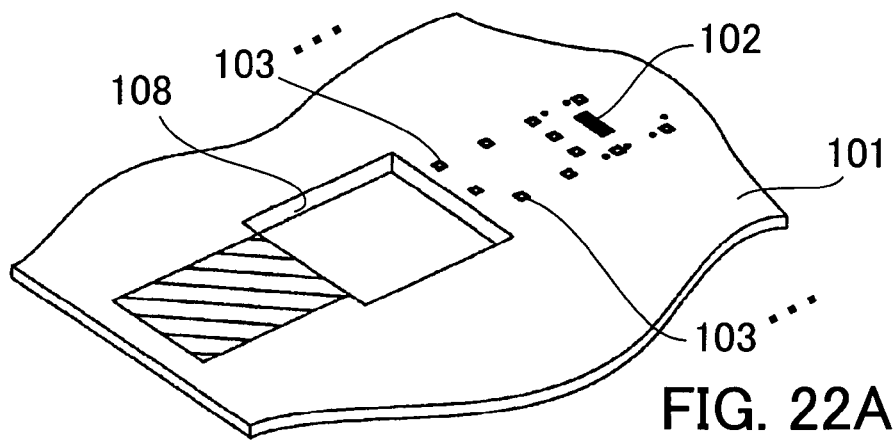
FIGS. 22A, 22B and 22C show conventional mounting structure and method for mounting an SFP module.
Figure 22B:
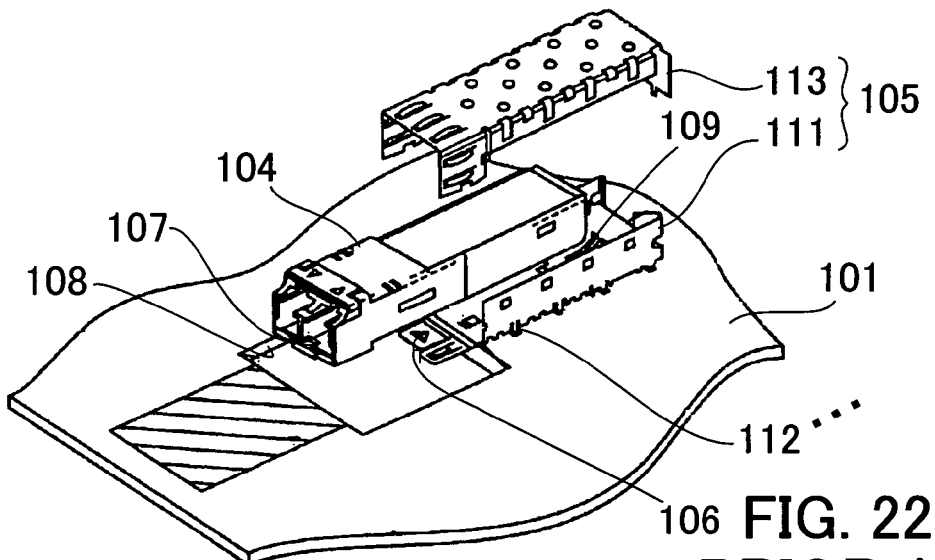
Figure 22C:
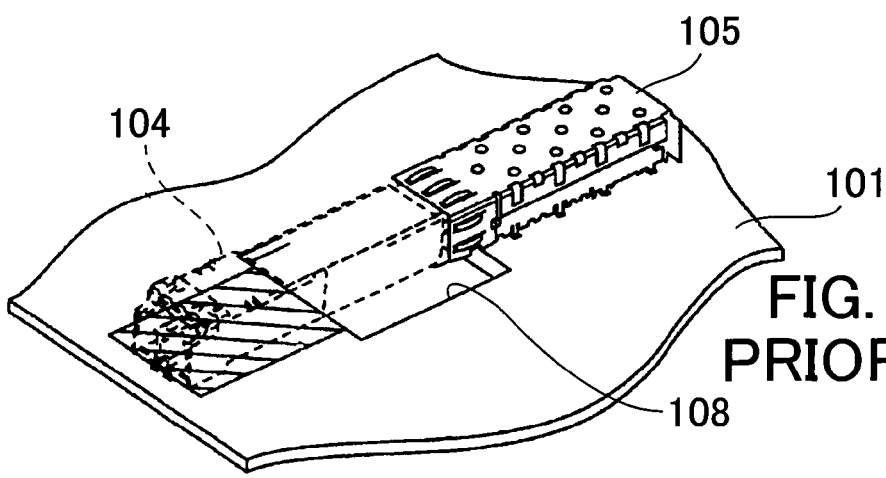
Figure 23A:
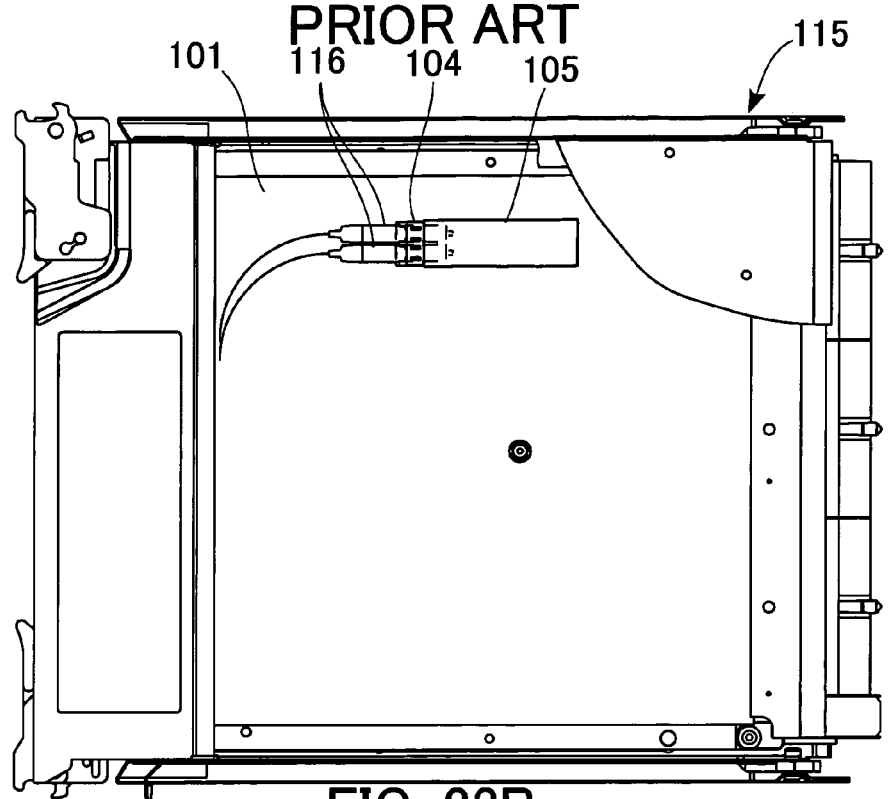
FIGS. 23A and 23B are partly cutaway views of a network interface card on which the SFP module is mounted.
Figure 23B:
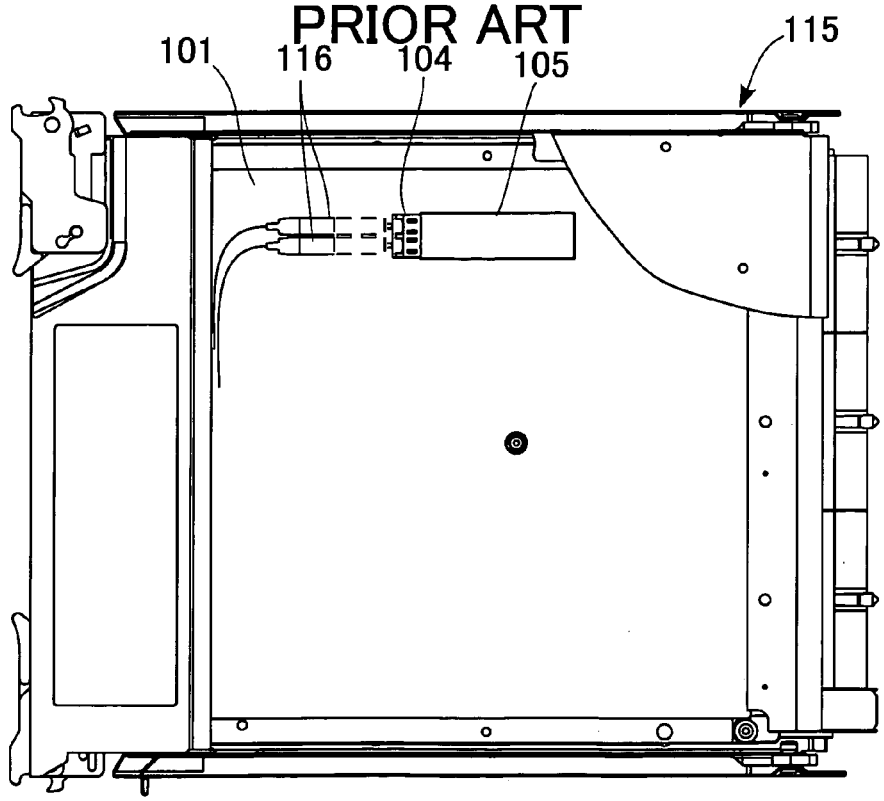

FIGS. 20A and 20B are each a perspective view of a network interface card on which are mounted SFP modules according to the modification, and FIGS. 21A and 21B illustrate an SFP module mounting structure according to the modification. In the figures, multiple SFP modules are mounted.

As shown in FIG. 20A, the multiple SFP modules 50 are arranged in a row inside the network interface card 260. When detaching an SFP module 50, the printed wiring board 201 is pulled out from within the network interface card 260, as shown in FIG. 20B.

Subsequently, with the optical fiber cables 61 attached to the SFP module 50, the holder 3 is swung away from the base 4 fixed to the printed wiring board 201, as shown in FIG. 21A, thereby releasing the holder from the fixed state.

As the holder 3 is swung about the pivots, the connection ports of the optical fiber cables 61 move in a direction away from the printed wiring board 201. While in this state, the optical fiber cables 61 are pulled out of the SFP module 50. At this time, each optical fiber cable 61 is pulled out at a location distant from the printed wiring board 201, and it is therefore unnecessary to take account of the pull stroke of the optical fiber cable 61 unlike the case where the optical fiber cable is pulled out near the printed wiring board 201.

Subsequently, the locking of the SFP module 50 and the holder 3 is released, and the SFP module 50 is pulled out, as shown in FIG. 21B. The SFP module 50 is also pulled out at a location remote from the printed wiring board 201; therefore, it is unnecessary to take account of the pull stroke of the SFP module 50 unlike the case where the SFP module is pulled out near the printed wiring board 201.

The SFP module 50 and the optical fiber cables 61 are attached to the mounting structure following the aforementioned steps in reverse order. Specifically, the front end portion of the holder 3 is swung away from the base 4 fixed to the printed wiring board 201 to be inclined obliquely, and the SFP module 50 is inserted into and connected to the holder 3. Subsequently, the optical fiber cables 61 are connected to the SFP module 50, and the holder 3 is swung back in a direction toward the printed wiring board 201. The holder 3 is then fixed to the base 4 by means of the engaging ridges 35 (see FIG. 1), whereupon the mounting procedure is completed.

In the above embodiment, the pivot holes 16 are formed in the holder 3 as the pivotal element, and the protuberances 39 are formed on the base 4 also as the pivotal element. Instead of the pivot holes, recesses (blind holes) for receiving the respective protuberances 39 may be formed in the holder 3. Alternatively, protuberances may be formed on the holder 3 and pivot holes or recesses may be formed in the base 4.

Also, in the above embodiment, the holder 3 is constituted by the lower and upper holders 5 and 6 separable from each other. Alternatively, the holder may be constituted by three or more separable members or may be formed as an inseparable one-piece hollow member. In the foregoing embodiment, as the engaging means for engaging the lower and upper holders 5 and 6 with each other, the claws 17 are formed on the lower holder 5 and the holes 23 are formed in the upper holder 6 to allow the respective claws to be inserted therethrough. The engaging means may be configured differently. For example, instead of the holes 23, recesses (blind holes) for receiving the respective claws 17 may be formed in the upper holder 6. Alternatively, claws may be formed on the upper holder 6 and holes or recesses for receiving the claws may be formed in the lower holder 5.

Further, in the foregoing embodiment, as the fixing means for fixing the holder 3 and the base 4 to each other, the longitudinal engaging ridges 35 each having the shape "<" in cross section are formed on the base 4 and the holes 15 for receiving the respective engaging ridges are formed in the lower holder 5. The fixing means may be configured differently. For example, instead of the holes 15, recesses (grooves) for receiving the respective engaging ridges 35 may be formed in the lower holder 5. Alternatively, engaging ridges protruding outward may be formed on the base 4 and holes or recesses for receiving the engaging ridges may be formed in the holder. Further, a plurality of engaging protuberances may be formed on each side wall of one of the base and the holder at predetermined intervals, and holes or recesses for receiving the respective engaging protuberances may be formed in the other of the base and the holder at locations corresponding to the engaging protuberances.

In the SFP module mounting structure of the present invention, the holder is swung away from the printed wiring board to be inclined obliquely relative thereto, to allow the SFP module to be attached or detached. It is therefore unnecessary to reserve an extra region on the printed wiring board to permit the SFP module to be moved over a certain stroke for the attachment/detachment. As a consequence, the SFP modules can be mounted onto a larger region of the printed wiring board and thus with higher density.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mounting structure for an SFP module which is connected to a connector mounted on a printed wiring board, comprising:

a holder adapted to guide the SFP module toward the connector and receive the SFP module; and a swing mechanism supporting the holder in a manner such that the holder is swingable in directions toward and away from the printed wiring board about a first pivotal element provided at one end of the holder close to the connector, wherein the swing mechanism includes a base fixed to the printed wiring board and having a second pivotal element for supporting the first pivotal element of the holder.

2. The mounting structure according to claim 1, wherein the holder has an opening formed at the other end thereof opposite the connector to permit the SFP module to be inserted into and pulled out of the holder, and wherein the swing mechanism permits the holder to be raised obliquely relative to a surface of the printed wiring board such that the opening of the holder is separated from the printed wiring board, thereby permitting the SFP module to be inserted into and pulled out of the holder in an oblique direction relative to the printed wiring board.

3. The mounting structure according to claim 1, wherein the first pivotal element comprises a protuberance formed on each side surface of the holder, and wherein the second pivotal element comprises a pivot hole formed in each side surface of the base for receiving and rotatably supporting the corresponding protuberance.

4. The mounting structure according to claim 1, wherein the first pivotal element comprises a pivot hole formed in each side surface of the holder, and wherein the second pivotal element comprises a protuberance formed on each side surface of the base and inserted into the corresponding pivot hole.

5. The mounting structure according to claim 1, wherein the base has a bottom wall and side walls situated so as to surround the connector, and fixing means adapted to engage with a part of the holder when the holder is swung toward the printed wiring board, and to fix the holder in position.

6. The mounting structure according to claim 5, wherein the fixing means is provided on the side walls of the base, and wherein, as the holder is swung toward the printed wiring board, the fixing means is pushed by the holder to be elastically deformed together with the side walls, and when the holder reaches a predetermined fixing position, the fixing means is restored from the elastic deformation and engages with a fixing element provided on side walls of the holder.

7. The mounting structure according to claim 6, wherein the fixing means comprises an engaging protuberance protruding inward from each of the side walls of the base, and wherein the holder has holes or recesses formed so as to face the respective engaging protuberances on the side walls of the base and capable of receiving the respective engaging protuberances.

8. The mounting structure according to claim 6, wherein the fixing means comprises holes or recesses formed in the respective side walls of the base, and wherein the holder has engaging protuberances for engaging with the respective holes or recesses.

9. The mounting structure according to claim 7, wherein the engaging protuberances are formed by partly bending the respective side walls of the base inward.

10. The mounting structure according to claim 1, wherein the holder has a fitting hole formed in a bottom surface thereof in the vicinity of the opening, wherein the SFP module has an engaging portion formed at an end portion thereof opposite the connector and capable of engaging with the fitting hole, and wherein the base has legs extending from a bottom thereof, each of the legs having a stepped shape such that a predetermined space is provided between the bottom of the base and the printed wiring board.

11. The mounting structure according to claim 1, wherein the holder has swing limiting means for preventing the holder from being swung in a direction away from the printed wiring board past a predetermined angle.

12. The mounting structure according to claim 11, wherein the swing limiting means comprises a stopper extending from the holder toward the printed wiring board and adapted to abut against the printed wiring board so as to stop the holder from being swung further.

13. The mounting structure according to claim 1, wherein the connector has electrodes which exert elastic force such that the electrodes come into contact with respective terminals of the SFP module when the SFP module is inserted into the holder with the holder kept in a swung state remote from the printed wiring board and remain connected to the respective terminals while the SFP module is swung to a predetermined fixing position near the printed wiring board.

14. The mounting structure according to claim 2, wherein the holder comprises a lower holder on which the SFP module is placed, and an upper holder which is combined with the lower holder to cooperatively form a hollow member for receiving the SFP module therein.

15. The mounting structure according to claim 14, wherein the first-pivotal element is provided on the lower holder.

16. The mounting structure according to claim 14, wherein the lower and upper holders have engaging means provided on respective side surfaces thereof at locations corresponding to each other, the engaging means engaging with each other to combine the lower and upper holders together.

17. The mounting structure according to claim 16, wherein the engaging means comprise claws protruding from the side surfaces of the lower holder, and holes or recesses formed in the side surfaces of the upper holder at locations corresponding to the respective claws.

18. The mounting structure according to claim 16, wherein the engaging means comprise claws protruding from the side surfaces of the upper holder, and holes or recesses formed in the side surfaces of the lower holder at locations corresponding to the respective claws.

19. A mounting structure for an SFP module which is connected to a connector mounted on a printed wiring board, comprising:

a holder adapted to guide the SFP module toward the connector and receive the SFP module; and a swing mechanism supporting the holder to be swingable in directions toward and away from the printed wiring board about a first pivotal element provided at a first end of the holder, wherein the swing mechanism includes a base fixed to the printed wiring board and has a second pivotal element for engaging the first pivotal element of the holder.

20. The mounting structure according to claim 19, wherein the holder has an opening formed at a second, opposite end thereof to permit the SFP module to be inserted into and pulled out of the holder, and wherein the swing mechanism permits the holder to be raised obliquely relative to a surface of the printed wiring board such that the opening of the holder is separated from the printed wiring board, thereby permitting the SFP module to be inserted into and pulled out of the holder in an oblique direction relative to the printed wiring board.

21. The mounting structure according to claim 19, wherein the first pivotal element includes a protuberance formed on each side surface of the holder, and
wherein the second pivotal element includes a pivot hole formed in each side surface of the base for receiving and rotatably supporting the corresponding protuberance.

22. The mounting structure according to claim 19, wherein the first pivotal element includes a pivot hole formed in each side surface of the holder, and
wherein the second pivotal element includes a protuberance formed on each side surface of the base and inserted into the corresponding pivot hole.

23. The mounting structure according to claim 19, wherein the base has a bottom wall and side walls adjacent the connector, and a fastener to engage a part of the holder when the holder is swung toward the printed wiring board, and to fasten the holder in position.

24. The mounting structure according to claim 23, wherein the fastener is provided on the side walls of the base, and
wherein, as the holder is swung toward the printed wiring board, the fastener is pushed by the holder to be elastically deformed together with the side walls, and when the holder reaches a first predetermined position, the fastener is restored from the elastic deformation and engages with a fixing element provided on side walls of the holder.

25. The mounting structure according to claim 24, wherein the fastener includes an engaging protuberance protruding inward from each of the side walls of the base, and
wherein the holder has receptacles facing the respective engaging protuberances on the side walls of the base that receive the respective engaging protuberances.

26. The mounting structure according to claim 24, wherein the fastener includes receptacles formed in the respective side walls of the base, and
wherein the holder has engaging protuberances for engaging the respective receptacles.

27. The mounting structure according to claim 25, wherein the engaging protuberances are formed by bending the respective side walls of the base.

28. The mounting structure according to claim 19, wherein the holder has a fitting hole formed in a bottom surface thereof,
wherein the SFP module has an engaging portion formed at an end portion thereof capable of engaging with the fitting hole, and
wherein the base is separated from the printed wiring board by a predetermined space.

29. The mounting structure according to claim 19, wherein the holder has a swing limiter for preventing the holder from being swung more than a predetermined angle.

30. The mounting structure according to claim 29, wherein the swing limiter includes a stopper extending from the holder toward the printed wiring board and adapted to abut against the printed wiring board.

31. The mounting structure according to claim 19, wherein the connector has electrodes which exert elastic force such that the electrodes come into contact with respective terminals of the SFP module when the SFP module is inserted into the holder with the holder kept in a swung state remote from the printed wiring board, and remain connected to the respective terminals while the SFP module is swung to a predetermined fixing position near the printed wiring board.

32. The mounting structure according to claim 19, wherein the holder includes a lower holder on which the SFP module is placed, and an upper holder which is combined with the lower holder to cooperatively form a hollow member for receiving the SFP module therein.

33. The mounting structure according to claim 32, wherein the first pivotal element is provided on the lower holder.

34. The mounting structure according to claim 32, wherein the lower and upper holders have an engaging member provided on respective side surfaces thereof at locations corresponding to each other, the engaging members engaging with each other to combine the lower and upper holders together.

35. The mounting structure according to claim 34, wherein the engaging members include claws protruding from the side surfaces of the lower holder, and receptacles formed on the side surfaces of the upper holder at locations corresponding to the respective claws.

36. The mounting structure according to claim 34, wherein the engaging members include claws protruding from the side surfaces of the upper holder, and receptacles formed in the side surfaces of the lower holder at locations corresponding to the respective claws.

* * * * *